US012645247B2

(12) United States Patent
Annam et al.

(10) Patent No.: US 12,645,247 B2
(45) Date of Patent: Jun. 2, 2026

(54) SYSTEM AND METHOD FOR CUMULATIVE LATENCY VOTING MODE FOR DCVS

(71) Applicant: QUALCOMM Incorporated, San Diego, CA (US)

(72) Inventors: Raja Shekhar Reddy Annam, Hyderabad (IN); Sriram Emarose, Chennai (IN); Aravind Korlepara, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 18/397,574

(22) Filed: Dec. 27, 2023

(65) Prior Publication Data

US 2025/0216887 A1 Jul. 3, 2025

(51) Int. Cl.
| | |
|---|---|
| *G06F 1/08* | (2006.01) |
| *G06F 1/324* | (2019.01) |
| *G06F 1/3296* | (2019.01) |

(52) U.S. Cl.
CPC ............... *G06F 1/08* (2013.01); *G06F 1/324* (2013.01); *G06F 1/3296* (2013.01)

(58) Field of Classification Search
CPC ........... G06F 1/08; G06F 1/324; G06F 1/3296
See application file for complete search history.

(56) References Cited

U.S. PATENT DOCUMENTS

2009/0204831 A1 * 8/2009 Cousson ................. G06F 1/324
                                                          713/322
2014/0223219 A1 8/2014 Aelion et al.

2015/0348223 A1 * 12/2015 Dorsey ................... G09G 5/18
                                                          345/473
2017/0352322 A1 * 12/2017 Spence ................... H04N 7/01
2018/0098083 A1 * 4/2018 Mcallister ........... H04N 19/103
2022/0165191 A1 * 5/2022 Yao ........................ G09G 5/006

FOREIGN PATENT DOCUMENTS

WO     WO-2021196175 A1     10/2021

OTHER PUBLICATIONS

International Search Report and Written Opinion—PCT/US2024/053926—ISA/EPO—Feb. 10, 2025.

* cited by examiner

*Primary Examiner* — Jaweed A Abbaszadeh
*Assistant Examiner* — Gayathri Sampath
(74) *Attorney, Agent, or Firm* — Muncy, Geissler, Old & Lowe, P.C.

(57) ABSTRACT

Systems, methods, and devices of the various embodiments provide managing an active clock frequency of a processor, including determining a preconfigured minimum clock frequency and a preconfigured maximum clock frequency using a first set of operating parameters of a first processing task and a second set of operating parameters of a second processing task, initiating execution of the first and the second processing tasks utilizing a DCVS framework using a current clock frequency equal to a target clock frequency, accumulating a first latency value and a second latency value and determining a steady state latency based on the first and second latency values, determining whether the steady state latency satisfies a target frame rate, and adjusting the current clock frequency in response to the determination that either the first steady state latency or the second steady state latency fails to satisfy the target frame rate.

20 Claims, 17 Drawing Sheets

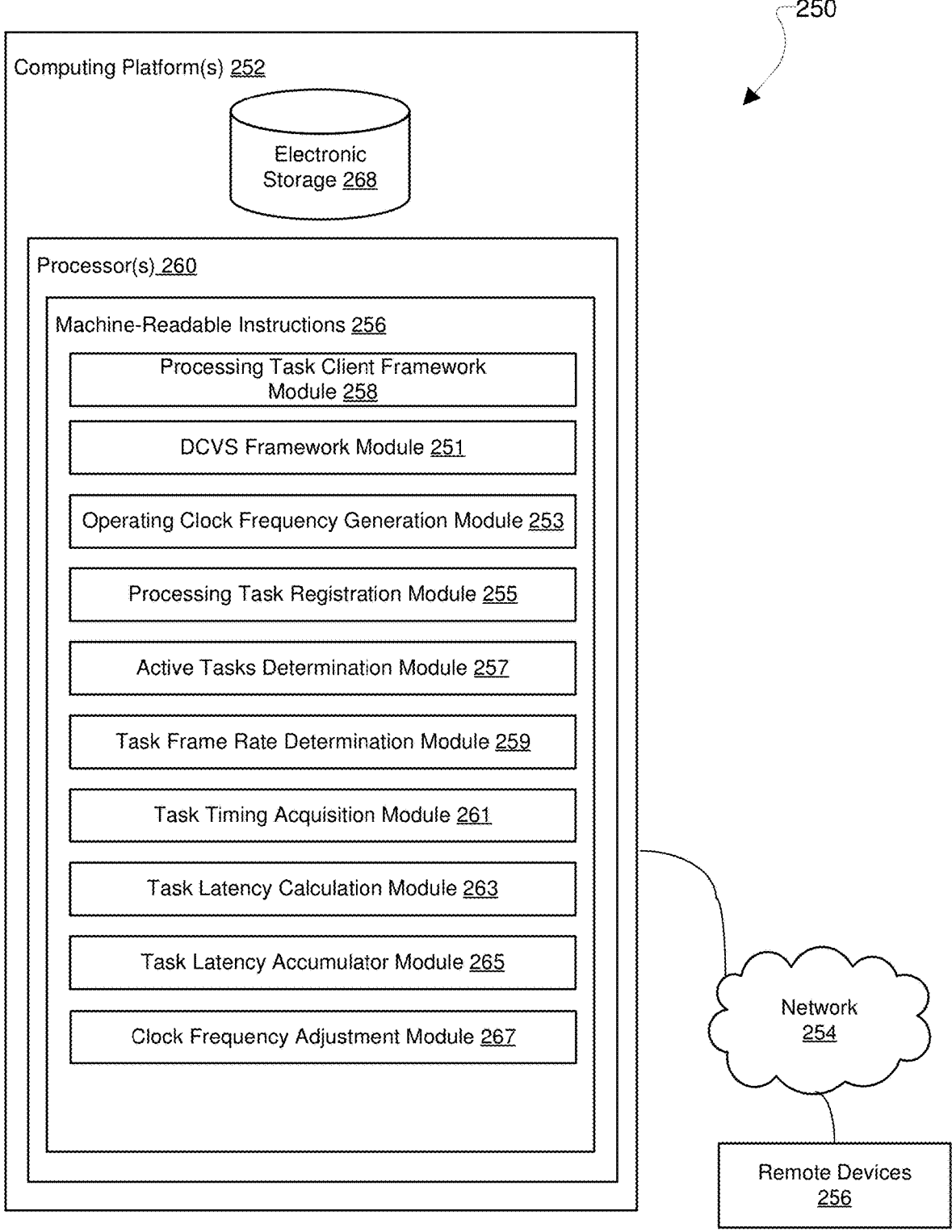

Computing Platform(s) 252

Electronic
Storage 268

Processor(s) 260

Machine-Readable Instructions 256

Processing Task Client Framework
Module 258

DCVS Framework Module 251

Operating Clock Frequency Generation Module 253

Processing Task Registration Module 255

Active Tasks Determination Module 257

Task Frame Rate Determination Module 259

Task Timing Acquisition Module 261

Task Latency Calculation Module 263

Task Latency Accumulator Module 265

Clock Frequency Adjustment Module 267

Network
254

Remote Devices
256

DCVS Framework          501

Per Algorithm Context:
· Compute latency from SOF & EOF
· Accumulate latency to reach steady state
· IF(Cumulative Latency for target FPS is met):
  • If current clock config is higher than target, bump down the
    clock
  • ELSE:
    • Bump Up the clock by one step
    • Reset Accumulated Latency Start of Frame (SOF)
End of Frame (EOF)          601a-b Start of Frame
End of Frame          602a-b 511a
Algorithm 1

Algorithm 2
511b

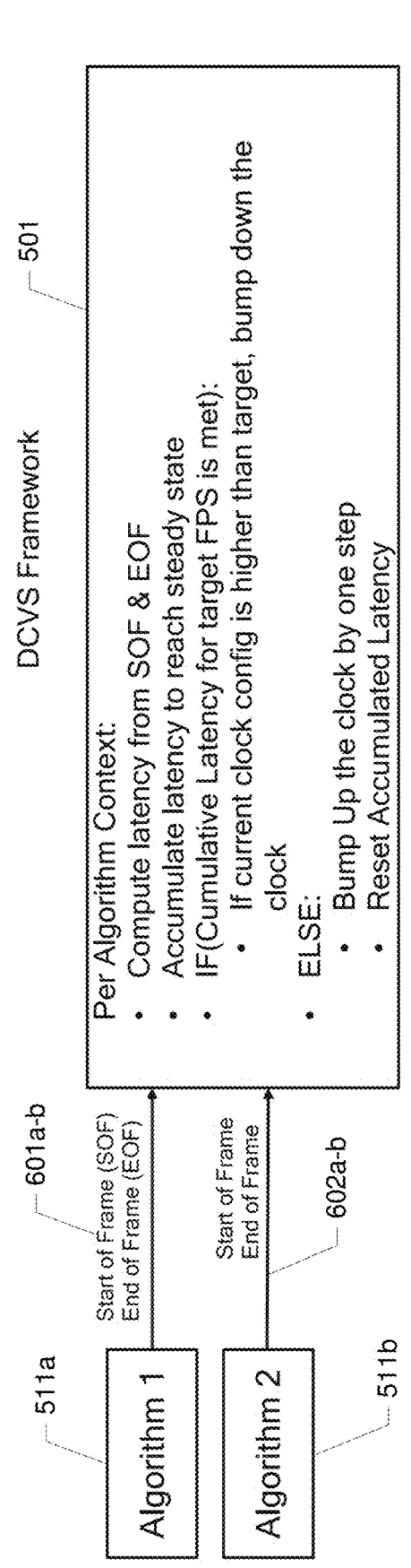

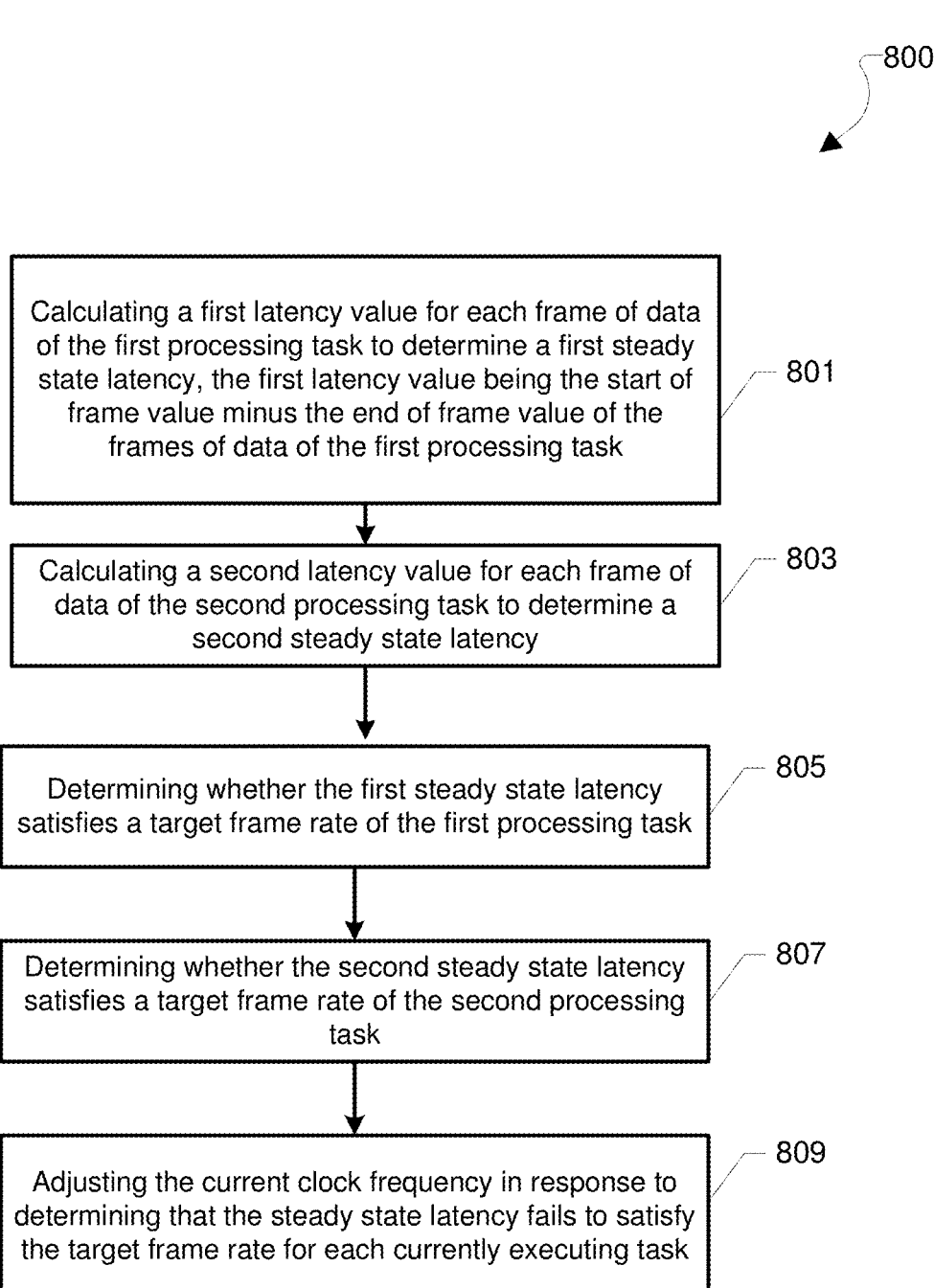

Calculating a first latency value for each frame of data of the first processing task to determine a first steady state latency, the first latency value being the start of frame value minus the end of frame value of the frames of data of the first processing task — 801

Calculating a second latency value for each frame of data of the second processing task to determine a second steady state latency — 803

Determining whether the first steady state latency satisfies a target frame rate of the first processing task — 805

Determining whether the second steady state latency satisfies a target frame rate of the second processing task — 807

Adjusting the current clock frequency in response to determining that the steady state latency fails to satisfy the target frame rate for each currently executing task — 809

Registering the first processing task with the CPU client framework — 901

Registering the second processing with the CPU client framework — 905

1000

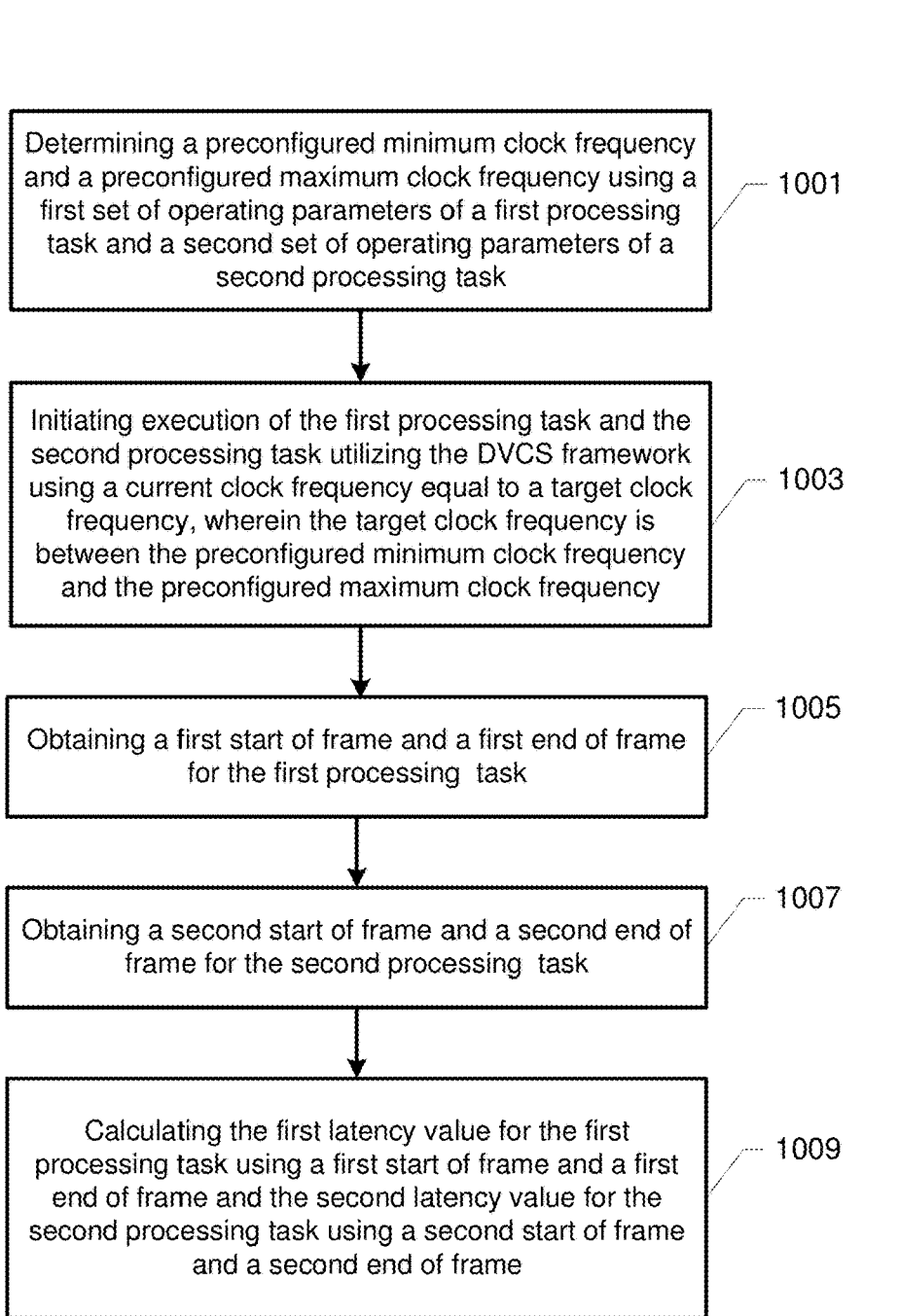

Determining a preconfigured minimum clock frequency and a preconfigured maximum clock frequency using a first set of operating parameters of a first processing task and a second set of operating parameters of a second processing task — 1001

Initiating execution of the first processing task and the second processing task utilizing the DVCS framework using a current clock frequency equal to a target clock frequency, wherein the target clock frequency is between the preconfigured minimum clock frequency and the preconfigured maximum clock frequency — 1003

Obtaining a first start of frame and a first end of frame for the first processing task — 1005

Obtaining a second start of frame and a second end of frame for the second processing task — 1007

Calculating the first latency value for the first processing task using a first start of frame and a first end of frame and the second latency value for the second processing task using a second start of frame and a second end of frame — 1009

FIG. 10

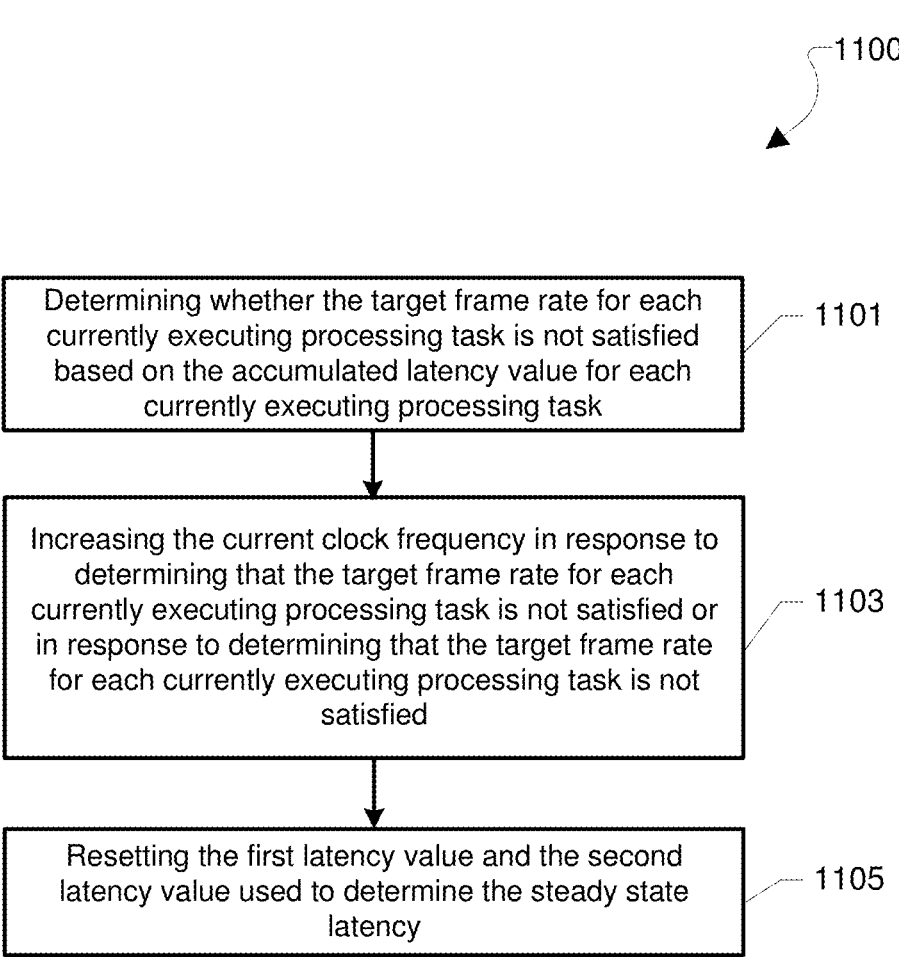

┌1100

Determining whether the target frame rate for each currently executing processing task is not satisfied based on the accumulated latency value for each currently executing processing task — 1101

Increasing the current clock frequency in response to determining that the target frame rate for each currently executing processing task is not satisfied or in response to determining that the target frame rate for each currently executing processing task is not satisfied — 1103

Resetting the first latency value and the second latency value used to determine the steady state latency — 1105

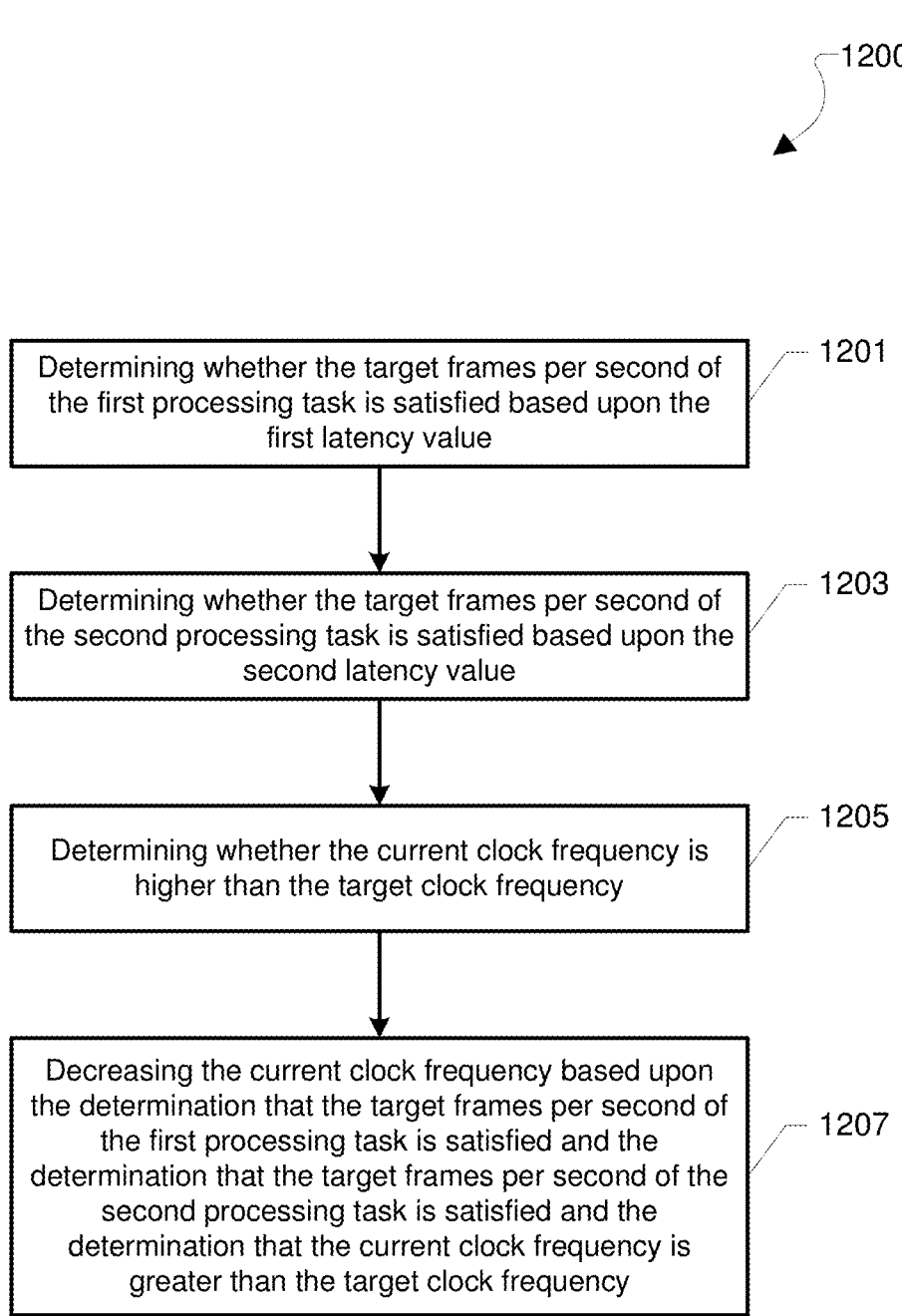

Determining whether the target frames per second of the first processing task is satisfied based upon the first latency value — 1201

Determining whether the target frames per second of the second processing task is satisfied based upon the second latency value — 1203

Determining whether the current clock frequency is higher than the target clock frequency — 1205

Decreasing the current clock frequency based upon the determination that the target frames per second of the first processing task is satisfied and the determination that the target frames per second of the second processing task is satisfied and the determination that the current clock frequency is greater than the target clock frequency — 1207

Setting the optimal minimum clock frequency to a maximum of the minimum clock frequencies for each of the concurrently executing processing task — 1301

Setting the optimal maximum clock frequency to a maximum of the maximum clock frequencies for each of the concurrently executing processing task — 1305

1500

1519

1518

1517

1511

1512

1515

1514

1513

SYSTEM AND METHOD FOR CUMULATIVE LATENCY VOTING MODE FOR DCVS

BACKGROUND

Mobile computing devices may be configured in various sizes and configurations for use as computing devices, gaming devices, media payers, communication devices, and other similar devices. Each of these types of devices are typically operated on electrical power provided by a battery. Use of these devices may benefit from reducing power consumption to extend the time the device can operate on a given battery charge. However, reducing power consumption may conflict with a need to operate the device at a higher clock frequency to satisfy processing requirements of various tasks running on a processor within each device.

SUMMARY

Systems, methods device, and devices of various embodiments enable a computing system to implement a method for managing an active clock frequency of a processor having a central processing unit (CPU) client framework and a Dynamic Clock and Voltage Scaling (DCVS) framework. In various aspects, a computing device may manage an active clock frequency of a processor having a CPU client framework and a distributed version control system (DCVS) framework.

Various aspects may include methods for managing an active clock frequency of a processing system having a CPU client framework and a DCVS framework, including: calculating a first latency value for each frame of data of the first processing task to determine a first steady state latency, the first latency value being a start of frame value minus an end of frame value of the frames of data of the first processing task; calculating a second latency value for each frame of data of the second processing task to determine a second steady state latency the second latency value being the start of frame value minus the end of frame value of the frames of data of the second processing task; and adjusting the current clock frequency in response to determining that either the first steady state latency or the second steady state latency fails to satisfy the target frame rate for each currently executing processing task.

Some aspects may further include registering the first processing task with the CPU client framework; and registering the second processing task with the CPU client framework.

Some aspects may further include obtaining a first start of frame time value and a first end of frame time value for the first processing task; determining a preconfigured minimum clock frequency and a preconfigured maximum clock frequency using a first set of operating parameters of a first processing task and a second set of operating parameters of a second processing task, in which the first and second processing tasks are executing concurrently; initiating execution of the first processing task and the second processing task utilizing the DCVS framework using a current clock frequency equal to a target clock frequency, in which the target clock frequency is between the preconfigured minimum clock frequency and the preconfigured maximum clock frequency; obtaining a second start of frame time value and a second end of frame time value for the second processing task; and determining the first latency value for the first processing task using a first start of frame and a first end of frame and determining the second latency value for the second processing task using a second start of frame and a second end of frame.

In some aspects, the first set of operating parameters for the first processing task and the second set of operating parameters for the second processing task each may include a minimum clock frequency, a maximum clock frequency, a target clock frequency, and a target frame rate.

In some aspects, adjusting the current clock frequency in response to determining that either the first steady state latency or the second steady state latency fails to satisfy the target frame rate for each currently executing processing task may include: determining whether the target frame rate for each currently executing processing task is not satisfied based on the accumulated latency value for each currently executing processing task; increasing the current clock frequency in response to determining that the target frame rate for each currently executing processing task is not satisfied or in response to determining that the target frame rate for each currently executing processing task is not satisfied; and resetting the accumulated latency value for each currently executing processing task used to determine the first and second steady state latency.

In some aspects, adjusting the current clock frequency in response to determining that either the first steady state latency or the second steady state latency fails to satisfy the target frame rate may determine whether the target frame rate of the first processing task is satisfied based on the first latency value, determine whether the target frame rate of the second processing task is satisfied based on the second latency value, determine whether the current clock frequency is higher than the target clock frequency, and decrease the current clock frequency in response to determining that the target frame rate of the first processing task is satisfied, that the target frame rate of the second processing task is satisfied, and that the current clock frequency is greater than the target clock frequency.

In some aspects, determining an preconfigured minimum clock frequency and an preconfigured maximum clock frequency may utilize the minimum clock frequency of the first processing task, the maximum clock frequency of the first processing task, the target clock frequency of the first processing task, the target frame rate for the first processing task, the minimum clock frequency of the second processing task, the maximum clock frequency of the second processing task, the target clock frequency for the second processing task, the target frame rate for the second processing task, and a number of concurrently executing processing tasks.

In some aspects, determining the preconfigured minimum clock frequency and the preconfigured maximum clock frequency may include: setting the preconfigured minimum clock frequency to a maximum value of the minimum clock frequencies for each of the number of concurrently executing processing tasks; and setting the preconfigured maximum clock frequency to a maximum value of the maximum clock frequencies for each of the concurrently executing processing tasks.

Various embodiments include a mobile computing device including a processing system configured with processor-executable instructions to perform operations of any of the methods described above. Various embodiments also include a non-transitory processor-readable storage medium having stored thereon processor-executable software instructions configured to cause a processor to perform operations of any of the methods described above. Various embodiments also include a mobile or wearable communication device that includes means for performing functions of any of the methods described above.

BRIEF DESCRIPTION OF THE DRAWINGS

The accompanying drawings, which are incorporated herein and constitute part of this specification, illustrate exemplary embodiments. Together with the general description given above and the detailed description given below, serve to explain the features of the various embodiments.

FIG. 2B illustrates a component block diagram illustrating a system configured for use in cumulative latency voting mode for DCVS in accordance with various embodiments.

FIG. 6 is a system block diagram illustrating an embodiment of a DCVS framework for use in cumulative latency voting mode for DCVS in accordance with various embodiments.

FIG. 8 is a process flow diagram illustrating a method for cumulative latency voting mode for DCVS in accordance with various embodiments.

FIG. 10 is a process flow diagram illustrating a method for cumulative latency voting mode for DCVS in accordance with various embodiments.

FIG. 11 is a process flow diagram illustrating a method for cumulative latency voting mode for DCVS in accordance with various embodiments.

FIG. 12 is a process flow diagram illustrating a method for cumulative latency voting mode for DCVS in accordance with various embodiments.

DETAILED DESCRIPTION

Figure 1:
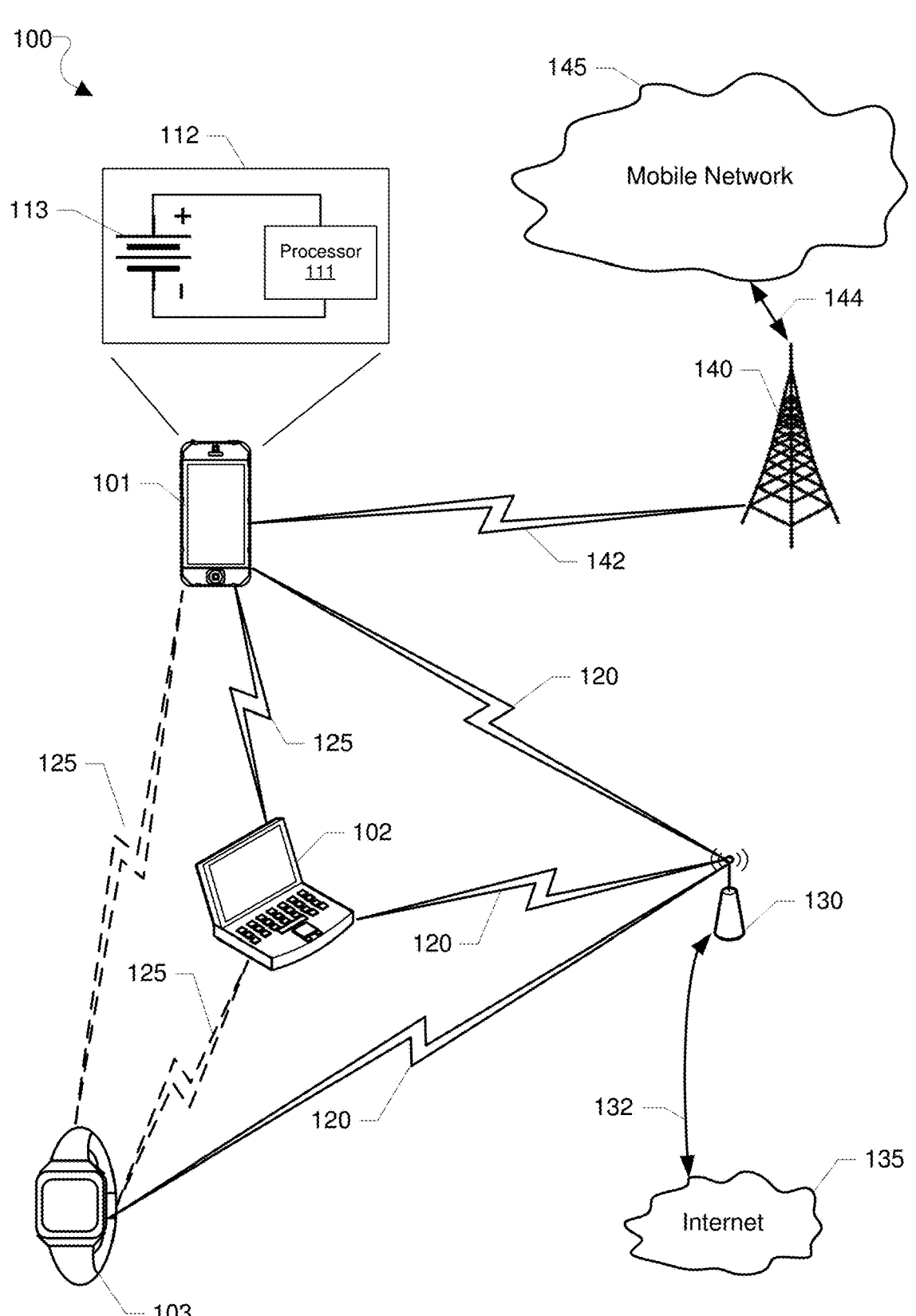
FIG. 1 is a communication system block diagram of mobile communications network suitable for use with various implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the various embodiments or the claims.

Various embodiments include methods, and computing devices implementing such methods, for managing an active clock frequency of a processor having a CPU client framework and a dynamic clock and voltage scaling (DCVS) framework. In various embodiments, a computing device may manage clock frequency supporting multiple operations executing in a digital signal processor (DSP) by determining a preconfigured minimum clock frequency and a preconfigured maximum clock frequency using a first set of operating parameters of a first processing task (e.g., a video processing task, an audio processing task, an image capture task, an augmented reality task) and a second set of operating parameters of a second processing task (e.g., another video task, audio task, image capture task, augmented reality task, etc.). Each of these two (or more tasks) may have a latency requirement or limit to support satisfactory completion of the tasks. The computing device may start the first and second processing tasks executing concurrently utilizing the DCVS framework using a current clock frequency equal to a target clock frequency between the preconfigured minimum clock frequency and the preconfigured maximum clock frequency. While the tasks execute, the computing device may calculate a first latency value for each frame of data of the first processing task as the difference between the start of frame value and the end of frame value of the frames of data of the first processing task (e.g., video tasks, audio tasks, augmented reality tasks, etc.). Similarly, the computing device may calculate a second latency value for each frame of data of the second processing task as the difference between the start of frame value and the end of frame value of the frames of data of the second processing task (e.g., video tasks, audio tasks, augmented reality tasks, etc.). The computing device may determine a first steady state latency based on the accumulated first latency value and determine a second steady state latency based on the first accumulated second latency value. Using these latency determinations, the computing device may determine whether the steady state latency satisfies a target frame rate of the first processing task (e.g., video tasks, audio tasks, augmented reality tasks, etc.) and whether the steady state latency satisfies a target frame rate of the second processing task (e.g., video tasks, audio tasks, augmented reality tasks, etc.). Based on these determinations, the computing device may adjust the current clock frequency in response to determining that either the first steady state latency or the second steady state latency fails to satisfy the target frame rate for each currently executing processing task.

The word "exemplary" is used herein to mean "serving as an example, instance, or illustration." Any implementation described herein as "exemplary" is not necessarily to be construed as preferred or advantageous over other implementations.

As used herein, the term "computing device" is used herein to refer to any one or all of smart watches, wearable computers (e.g., computing devices in the form of a badge, tag, bracelet, patch, belt buckle, medallion, necklace, pendant, pen, key chain, or any other device worn or carried by a user), cellular telephones, smart phones, personal or mobile multi-media players, personal data assistants (PDAs), wireless electronic mail receivers, multimedia Internet enabled cellular telephones, wireless gaming controllers, and similar personal electronic devices that include one or more programmable processor, memory, and a touch-screen display or similar user interface for displaying characters and/or images. A computing device may also include a device with a small display that may be attached to or integrated with a small area of an appliance, furniture, on a small area of a vehicles (e.g., on motorcycles, bicycles, or cars), and on small hand-held computing devices such as tablets and smart phones. Because the area of such a display is relatively small, to receive user inputs the small display is typically configured with a touch screen and may also include a button or buttons on the body of the display.

The term "wireless device" is used herein to refer to any one or all of wireless router devices, wireless appliances, cellular telephones, smartphones, portable computing devices, personal or mobile multi-media players, laptop computers, tablet computers, smart books, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high-speed communication circuitry and packaged in close proximity, such as on a single motherboard or in a single wireless device. The proximity of the SOCs facilitates high speed communications and the sharing of memory and resources.

As used herein, the term "processing system" is used herein to refer to one or more processors, including multi-core processors, that are organized and configured to perform various computing functions. Various embodiment methods may be implemented in one or more of multiple processors within a vehicle processing system as described herein.

The term "charged battery operating time" is used herein to refer to an amount of time a battery-powered mobile device can operate using a charged battery before the battery requires recharging.

The term "operating clock frequency" is used herein to refer to a number of processing operations performed during a given unit of time by a processor within mobile computing devices.

The term "processing task" is used herein to refer to a set of operations performed by a processor to provide users of mobile devices with desired functionality. Each set of operations is typically organized into applications that may be concurrently performed by the processor of the mobile device. Various embodiments are particularly useful for processing tasks that require a minimum quality-of-service to support a maximum latency. Non-limiting examples of some types of processing tasks that can require or operate best with a maximum latency video capture and/or processing tasks, audio decoding and rendering tasks, audio-visual processing and rendering tasks, and augmented reality tasks. Many applications requiring running latency sensitive tasks in parallel or concurrently. For example, audio-visual task of capturing and saving video, as well as receiving and rendering audio with video may have strict latency requirements on both the audio capture/encoding or decoding/rendering tasks and the audio capture/encoding or decoding/rendering tasks to ensure close synchronization of lip movements to voice. As another example, augmented reality applications, including virtual reality game applications, may impose tight latency requirements to minimize delays between user commands, headset orientation/pose and video capture upload tasks and the responsive downloaded visual and/or audio outputs. For ease of reference, these examples are referred to collectively as video tasks, audio tasks, augmented reality tasks, etc.

The term "latency value" is used herein to refer to a measure of time between start of processing operated performed on a frame of data and the completion of the processing operations performed on a subsequent frame of data. Processing tasks require a positive latency value indicating that the mobile device's processor may provide processing operations predetermined to be needed by the corresponding processing tasks (e.g., video tasks, audio tasks, augmented reality tasks, etc.). A negative latency value indicates that all of the processing operations predetermined to be needed by each processing task before additional data is processed (e.g., video tasks, audio tasks, augmented reality tasks, etc.). Larger latency values may permit an operating clock frequency to be lowered resulting in lower power consumption by the mobile device. Negative latency values may be reduced or eliminated by raising the operating clock frequency.

The term "accumulated latency value" is used herein to refer to an accumulation of the latency values for concurrently running processing tasks performed by a processor within the mobile device.

The term "steady state latency value" is used herein to refer to an accumulated latency value calculated for each frame of data in which the accumulated latency value of subsequent frames of data is approximately unchanging following the addition or the removal of a concurrently running processing task performed by a processor within the mobile device and following the raising and lowering of the operating clock frequency of the processor within the mobile device.

The term "dynamic clock and voltage scaling" (DCVS) is used herein to refer to a DVCS circuit for dynamically adjusting an operating clock frequency by DCVS circuits employed in processor-based electronic devices, including user-equipment mobile electronic devices. DCVS circuits control clock frequency and voltage level settings by predicting a particular clock frequency and voltage settings for a processor and/or other synchronously clocked components based on performance demands of the mobile device and corresponding concurrently running processing tasks.

Higher operating clock frequencies used by the processors of computing devices typically result in better performance (e.g., reduced latency) in executing applications, but at the cost of higher power consumption that can reduce time that the computing device can operate on a given battery charge (i.e., reduced charged battery operating time). Increasing the charged battery operating time may be accomplished by reducing the operating clock frequency. A compromise between performance and charged battery operating time may involve selecting a clock frequency that supports a predetermined amount of processing operations needed to satisfy performance requirements for processing tasks (e.g., video tasks, audio tasks, augmented reality tasks, etc.). Selecting the operating clock frequency may also consider the predetermined amount of processing operations needed by all concurrently running processing tasks that may dynamically change based on the commands of a device user. Improving the selections of the operating clock frequency based upon the concurrently running processing tasks at a given time may result in longer charged battery operating times for computing devices.

Various embodiments include methods for managing an operating clock frequency of a processor using cumulative latency voting mode. Software applications that that is executed and becomes a processing task running on the computing device processing system may include a set of operating parameters that may be used to calculate a minimum operating clock frequency needed by the processing system to support a response timeliness (e.g., latency) satisfying a desired quality of service. Various embodiments enable the processing system to determine executing processing tasks and corresponding operating parameters for use in dynamically setting a current operating clock frequency that balances performance against charged battery operating time.

For example, processing tasks that process and/or generate a sequence of images for display as a video stream, and any corresponding audio stream, require processing of each frame of video to be performed in time relative to subsequent frames of video so that the sequence of video frames (e.g., video data, audio data, augmented reality data, etc.) are displayed at a predefined frame rate, which may be synchronized to audio outputs (e.g., synching lip movements to speech). When the processing of each frame of video takes longer to process than the time allotted for a frame (i.e., exceeds a latency requirement) to be displayed (which may occur when a processor's operating clock frequency is too low), the displayed video stream, and any corresponding audio stream, may appear to users at a less than desired frame rate or with sounds (e.g., speech, sound effects, etc.) out of synch with movements in the video stream (e.g., speaker lip movements, actions associated with sound effects).

When multiple processing tasks are concurrently executing on the same processor, the available processing bandwidth at the operating clock frequency may be insufficient to provide the video stream, and any corresponding audio stream, with a desired or minimum quality of service to satisfy a maximum latency requirement. Raising the operating clock frequency typically results in additional processing bandwidth, which may provide the desired or minimum quality of service for the output of a video stream and corresponding audio stream (e.g., video tasks, audio tasks, augmented reality tasks, etc.). When processing demands from the concurrently executing processing tasks decreases (e.g., when one or more processing tasks enter an idle state and/or one or more processing tasks are terminated), the operating clock frequency may be lowered to clock frequency that reduces power consumption, thereby extending the operating time of mobile devices on a given battery charge.

Various embodiments calculate a latency value for each concurrently executing processing task determined for each frame of data processed by the processing system. Various embodiments accumulate each of the latency values for the concurrently executing processing task (e.g., video tasks, audio tasks, augmented reality tasks, etc.) to generate a steady state latency value for all of currently executing processing tasks.

Various embodiments generate a current operating clock frequency needed to obtain a latency value associated with each concurrently executing processing task (e.g., video tasks, audio tasks, augmented reality tasks, etc.) based on the corresponding operating parameters. Various embodiments increase the current operating clock frequency of the processing system in response to a steady state latency value determined to be negative and/or too small value. Various embodiments decrease the current operating frequency when the steady state latency is determined to be greater than a predefined value in order to reduce power consumption of the processing system.

In various embodiments, the mobile computing devices are pre-configured with software to perform the methods. The methods register a software application with its corresponding operating parameters. The methods utilize the operating parameters to calculate a current operating frequency for a processing system executing one or more processing tasks when the task corresponds to the concurrently executing processing tasks (e.g., video tasks, audio tasks, augmented reality tasks, etc.).

Various embodiments use operating parameters of each processing task (e.g., video tasks, audio tasks, augmented reality tasks, etc.) including a minimum clock frequency, a maximum clock frequency, a target clock frequency, and a target frame rate. Various embodiments generate a preconfigured minimum clock frequency and a preconfigured maximum clock frequency utilizes a minimum clock frequency of the first processing task, a maximum clock frequency of the first processing task, a target clock frequency of the first processing task, a target frame rate for the first processing task, a minimum clock frequency of the second processing task, a maximum clock frequency of the second processing task, a target clock frequency of the second processing task, a target frame rate for the second processing task, and a number of concurrently executing processing tasks (e.g., video tasks, audio tasks, augmented reality tasks, etc.). The current operating clock frequency is generated using the preconfigured minimum clock frequency and the preconfigured maximum clock frequency.

Various embodiments obtain a first start of frame time value and a first end of frame time value for the first processing task, obtain a second start of frame time value and a second end of frame time value for the second processing task, and calculate the first latency value for the first processing task using a first start of frame and a first end of frame and determining the second latency value for the processing learning task using a second start of frame and a second end of frame.

The operations of the embodiments are disclosed in the figures and involve the following: adjusting the current clock frequency in response to determining that either the first steady state latency or the second steady state latency fails to satisfy the target frame rate by determining whether the target frame rate of the first processing task (e.g., video tasks, audio tasks, augmented reality tasks, etc.) is not satisfied based on the first latency value, determining whether the target frame rate of the second processing task (e.g., video tasks, audio tasks, augmented reality tasks, etc.) is not satisfied based on the second latency value, increasing the current clock frequency in response to determining that the target frame rate of the first processing task is not satisfied or in response to determining that the target frame rate of the second processing task is not satisfied and resetting the first latency value and the second latency value used to determine the first and second steady state latency. The figures and also involve the following: determining whether the target frame rate of the first processing task is satisfied based on the first latency value, determining whether the target frame rate of the second processing task is satisfied based on the second latency value, determining whether the current clock frequency is higher than the target clock frequency, and decreasing the current clock frequency in response to determining that the target rate of the first processing task is satisfied, that the target frame rate of the second processing task is satisfied, and that the current clock frequency is greater than the target clock frequency.

Various embodiments of managing an operating clock frequency of a processing system using cumulative latency voting mode are provided for processing systems in mobile devices in accordance with various embodiments. The various embodiments illustrated in FIGS. 1-16 are examples of using cumulative latency voting mode to manage setting an operating frequency of a processing system in order ensure that an accumulated latency for the concurrently executing processing tasks (e.g., video tasks, audio tasks, augmented reality tasks, etc.) are satisfied while using a lower operating clock frequency, when possible, in order to minimize power consumption by the processing system. A measure of an observed latency is generated for each concurrently executing processing task (e.g., video tasks, audio tasks, augmented reality tasks, etc.) that are accumulated into a single latency value. The operating clock frequency may be adjusted using the observed latency associated with each concurrently executing task and the accumulated latency.

FIG. 1 is a system block diagram of mobile communications network suitable for use with various implementations. Mobile devices 101, 102, and 103 may be utilized to provide communications between these devices enabling a multitude of functions. These mobile devices may include a smartphone 101, a laptop computer 102, and a wearable computing device 103, for example, a smartwatch.

Each of these mobile devices 101, 102, and 103 include processing systems 112 in which processing operations defined by software code are performed to support these functions. The processing system 112 includes in part one or more processors 111, such as a microprocessor or similar programmable device, configured to perform processing operations and a battery 113 or similar portable power source used by the mobile devices 101, 102, and 103 to operate.

For many processing functions, the processor 111 may need to operate at a minimum operating throughput, for example a minimum number of operations per second, in order to complete the processing operations performed upon a block or packet of data being sent and received before a next block or packet of data needs to be processed. For example, minimum processing throughput for a processing task generating and/or processing frames of video from a video stream may be determined by measuring whether the frames of video processed are completed at or above a desired frame rate of the video stream to provide a quality of service for viewing the video stream, and any corresponding audio stream (e.g., video tasks, audio tasks, augmented reality tasks, etc.).

At the same time, the processor 111 may also need to operate at a minimum operating throughput that corresponds to the lowest operating throughput supporting the processing operations performed upon a frame of video data being sent and received before a next frame of video data needs to be processed in order to minimize power consumption of the processor 111, and thus maximize the operating time of the mobile devices 101, 102, and 103 powered by a battery 113.

Various implementations may be implemented within a variety of communication systems 100, such as at least one mobile telephony network, an example of which is illustrated in FIG. 1. A mobile network 145 typically include a plurality of cellular base stations (such as a base station 140).

The communication system 100 may include a plurality of mobile devices 101, 102, and 103. A first mobile device 101 (e.g. a smartphone) may be in communication with the mobile network 145 through a cellular connection 142 to the network access point 130. Mobile devices 101, 102, and 103 may be in communication with the Internet 135 through a network connection 132 via a network access point 130.

The base station 140 may be in communication with the mobile network 145 over a wired connection 144. The cellular connection 142 may be made through two-way wireless communication links, such as Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), Universal Mobile Telecommunications Systems (UMTS), and other mobile telephony communication technologies.

The plurality of mobile devices 101, 102, and 103 also may be connected to the wireless access point 130 supporting a local area network (LAN) 155 among all of the devices. The wireless access point 130 may be configured to connect to the Internet 135 or another network over a wired connection 132, such as to provide Internet access to the plurality of mobile devices 101, 102, and 103.

In addition to supporting the wireless communications to the mobile network 145, and to the network access point 130 supporting a local area network 120, each of the mobile devices 101, 102, and 103 may be configured to establish direct device-to-device (D2D) communication links 125. The device-to-device communication links 125 enable each of the mobile devices 101, 102, and 103 to exchange data without communicating via the local area network 120 or mobile network 145. For example, the device-to-device communication links 125 may be established via BLUETOOTH®, Wi-Fi, LTE Direct, Distributed Coordination Function (DCF) technology, and other similar types of direct communications protocols.

In various embodiments, processing tasks in addition to communications functions may also benefit from adjusting the operating throughput of the processor 111 to provide a response time to a user input to the mobile devices 101, 102, and 103, for example a desired frame rate of a video stream, and any corresponding audio stream, (e.g., video tasks, audio tasks, augmented reality tasks, etc.) acceptable to a user while maintaining a longer battery life. Similar tradeoffs between power consumption and operating throughput exist in these additional processing functions. For example, data processing/reception tasks that impose strict latency requirements may include video capture (e.g., taking video with your smartphone, video games, augmented reality, video conferencing), audio capture or rendering (e.g., keeping voice sounds synched with lip movements in movies and video games), and camera and display orientation and direction information sent from virtual reality headsets to a responsive source of virtual or augmented reality audio-visual outputs (such as in virtual reality video games).

Figure 2A:
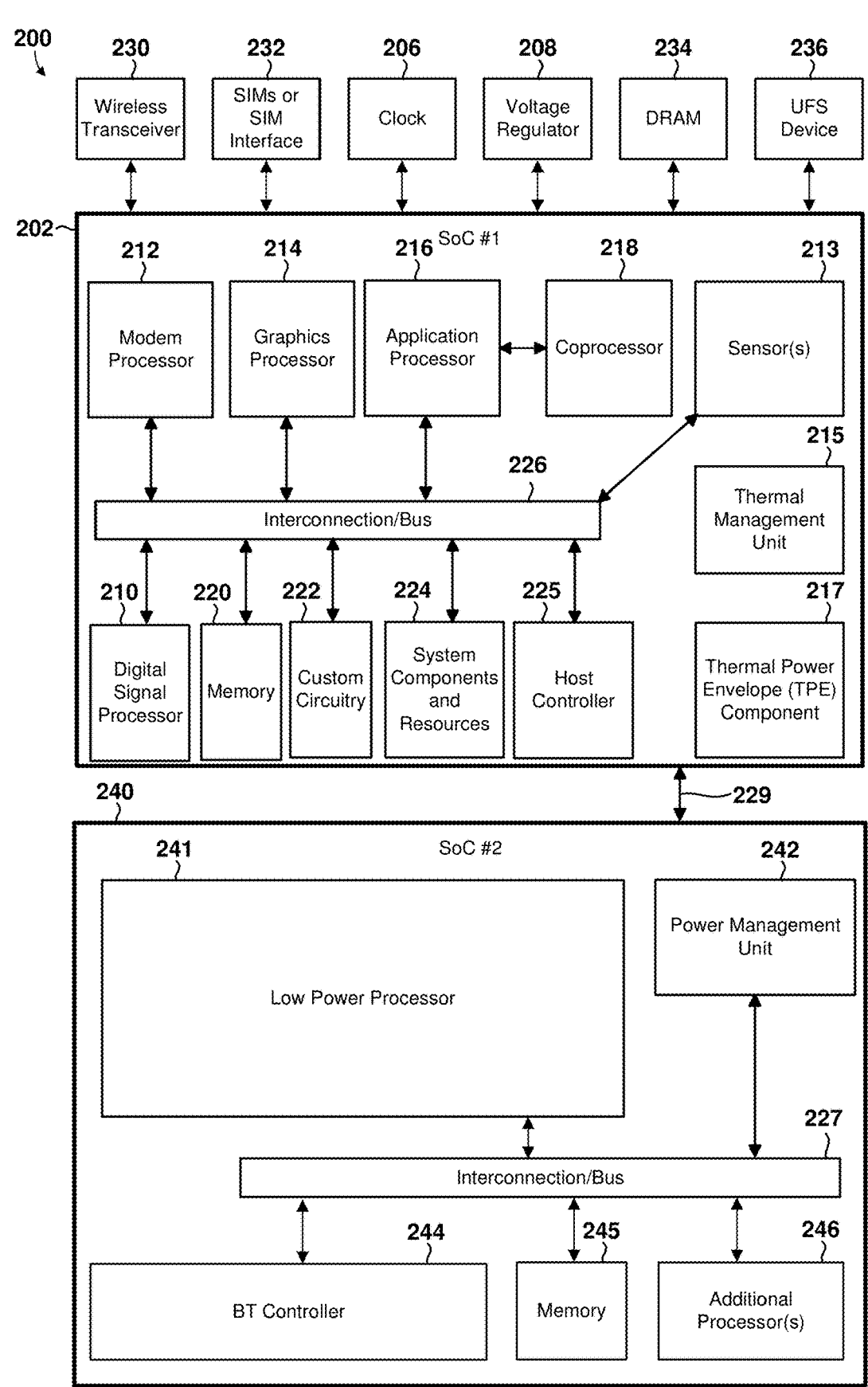
FIG. 2A is a functional block diagram of a computing device suitable for implementing various implementations.

FIG. 2A is a component block diagram illustrating an example computing device 200 suitable for implementing any of the various embodiments. Various embodiments may be implemented on a number of single-processor and multi-processor computer systems, including a system-on-chip (SoC) or system in a package (SIP).

With reference to FIGS. 1-2A, the illustrated example computing device 200 (which may be a system-in-a-package in some embodiments) includes a two SoCs 202, 240 coupled to a clock 206, a voltage regulator 208, at least one subscriber identity module (SIM) 232 and/or a SIM interface, a DRAM 234, a universal flash storage (UFS) device 236 for storage, a wireless transceiver 230 configured to send and receive wireless communications via an antenna (not shown) to/from wireless computing devices, such as a base station, wireless device, and/or computing device. In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 240 may operate as a specialized processing unit. For example, the second SoC 240 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, a host controller 225, an interconnection/bus module 226, one or more sensors 213 (e.g., accelerometer, temperature sensor, pressure sensor, optical sensor, infrared sensor, analog sound sensor, etc.), a thermal management unit 215, and a thermal power envelope (TPE) component 217. The second SoC 240 may include a low power processor 241, a power management unit 242, an interconnection/bus module 227, a BT controller 244, memory 245, and various additional processors 246, such as an applications processor, packet processor, etc.

Each processor 210, 212, 214, 216, 218, 241, 246 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 241, 246 may be included as part of a processor cluster architecture (e.g., a synchronous processor cluster architecture, an asynchronous or heterogeneous processor cluster architecture, etc.).

The first and second SoC 202, 240 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 240 may communicate via interconnection/bus module 229. In some embodiments, the interconnection/bus module may be a connection established by transceiving (i.e., receiving and transmitting) components within both the SoC 202 and SoC 240. For example, the low power processor 241 may include a universal asynchronous receiver-transmitter (UART) and the application processor 216 may include a multiple signal messages (MSM) UART driver that is communicatively connected to the UART of the low power processor 241.

The various processors 210, 212, 214, 216, and 218, may be interconnected to one or more memory elements 220, system components and resources 224, and custom circuitry 222, and a thermal management unit 215 via an interconnection/bus module 226. Similarly, the low power processor 241 may be interconnected to the power management unit 242, the BT controller 244, memory 245, and various additional processors 246 via the interconnection/bus module 227. The interconnection/bus module 226, 229, 227 may include an array of reconfigurable logic gates and/or implement a bus architecture (e.g., CoreConnect, AMBA, etc.). Communications may be provided by advanced interconnects, such as high-performance networks-on chip (NoCs).

In various embodiments, any or all of the processors 210, 212, 214, 216, and 218 in the system may operate as the SoC's main processor, central processing unit (CPU), microprocessor unit (MPU), arithmetic logic unit (ALU), etc. One or more of the coprocessors 218 may operate as the CPU. In addition to the example SIP 100 discussed above, various embodiments may be implemented in a wide variety of computing systems, including a single processor, multiple processors, multicore processors, or any combination thereof.

The first and/or second SoCs 202, 240 may further include an input/output module (not illustrated) for communicating with resources external to the SoC, such as a clock 206, a voltage regulator 208, one or more wireless transceivers 230, and at least one SIM 232 and/or SIM interface (i.e., an interface for receiving one or more SIM cards). Resources external to the SoC (e.g., clock 206, voltage regulator 208) may be shared by two or more of the internal SoC processors/cores.

In addition to the example computing device 200 discussed above, various embodiments may be implemented in a wide variety of computing systems, which may include a single processor, multiple processors, multicore processors, or any combination thereof. In some embodiments, the various processors of the SoC 202 and SoC 240 may be located within a same SoC. For example, the application processor 216 and low power processor 241 may be located within a same SoC, such as in a single SoC of a wearable device, to perform optimized storage routines with the UFS device 236.

FIG. 2B illustrates a component block diagram illustrating a system configured managing an active clock frequency of a processor having a CPU client framework and a distributed version control system framework in accordance with various embodiments. With reference to FIGS. 1-2B, some embodiments of system 250 may include one or more remote platforms/devices 256 coupled to a network 254. With reference to FIGS. 1-2B, computing platform(s) 252 may include one or more mobile devices (e.g., the mobile device 101, 102, and 103.

Computing platform(s) 252 may be configured by machine-readable instructions 256 executing by one or more processors 260. Machine-readable instructions 256 may include one or more instruction modules. The instruction modules may include computer program modules that may be executed by one or more processing systems. Alternatively or in addition, computing platform(s) 252 may be configured with specialized hardware, including dedicated to particular functionality, which may include hardware configured with firmware, to perform some processes some operations performed by computing platforms. Further, some computing platform operations may be performed by combinations of specialized hardware and processors executing software modules. Therefore, the term "module" is used herein to encompass the various combinations of hardware, software and firmware/hardware implementation.

The modules may include a processing task client framework configuration module 258, a DCVS power management module 251, an operating clock frequency generation module 253, a processing task registration module 255, an active processing tasks determination module 257, a processing task frame rate determination module 259, a processing task timing acquisition module 261, a processing task latency calculation module 263, a processing task latency accumulator module 265, a clock frequency adjustment module 267, and other hardware, software and firmware/hardware modules.

The processing task cumulative configuration generator 258 implements cumulative latency voting of concurrently executing processing tasks. The processing task cumulative config generator 258 utilizes data obtained from other processing modules to generate data used within a DCVS Framework by the DCVS power management module 251 to implement a processor operating configuration in accordance with the various embodiments. The processing task cumulative config generator 258 may be performed by a processing system (e.g., 112, 200, 202, 240, 252, 301) including one or more processors (e.g., 111, 210, 212, 214, 216, 218, 241, 260) and/or hardware elements, any one or combination of which may be configured to perform any of the operations of the processing task cumulative config generator 258. The processing task cumulative config generator 258 is described in more detail in reference to embodiments in FIGS. 3-6.

The DCVS power management module 251 implements a power management process that dynamically controls the processor operating clock frequency and operating voltage when executing processing tasks. The DCVS framework module 251 obtains operating parameters to determine operating clock frequency and operating voltage capable to provide a preconfigured level of processing performance for executing processing tasks while minimizing power consumption by the processor to an extent possible. The DCVS power management module 251 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the DCVS power management module 251. The DCVS power management module 251 is described in more detail in reference to embodiments in FIG. 6.

The operating clock frequency generation module 253 generates a current operating clock frequency when a processing task is instantiated or terminated using the sets of operating parameters for each of the concurrently executing processing tasks. The generated current operating clock frequency is an initial clock frequency value based upon the preconfigured parameters that is subsequently adjusted as needed using the accumulated latency values generated in operating clock frequency generation module 253 task cumulative config generator 258 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the operating clock frequency generation module 253.

The processing task registration module 255 accepts a set of operating parameters used by a processing task when instantiated and before execution starts for a particular processing task. These parameters include a minimum clock frequency, a maximum clock frequency, a target clock frequency, and a target frame rate. The processing task registration module 255 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the processing task registration module 255.

The active processing tasks determination module 257 maintains identities for each of the concurrently executing processing tasks. The identity of executing processing tasks may be maintained within a set of concurrently executing processing tasks that may be used by other processing modules when generating latency values and accumulated steady state latency values. The active processing tasks determination module 257 detects initiation of execution for a processing task and termination of execution by the processing task to maintain the set of concurrently executing processing tasks. The active processing tasks determination module 257 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the active processing tasks determination module 257. The active processing tasks determination module 257 is described in more detail in reference to embodiments in FIG. 5.

The processing task frame rate determination module 259 calculates a current frame rate for frames of data processed by each of the concurrently executing processing tasks using latency values provided by the processing task latency calculation module 263 and a corresponding target frame rate for the corresponding processing task. The processing task frame rate determination module 259 may determine whether a video stream, and any corresponding audio stream, processed for output to a mobile device 101, 102, 103, may be output at a desired frame rate to provide a desired quality of service for the video stream, and any corresponding audio stream (e.g., video tasks, audio tasks, augmented reality tasks, etc.). The processing task frame rate determination module 259 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the processing task frame rate determination module 259.

The processing task timing acquisition module 261 obtains a start of frame time value and an end of frame time value for each data frame (e.g., video data, audio data, augmented reality data, etc.) associated with one of the concurrently executing processing tasks. The processing task timing acquisition module 261 can normalize the time values associated with a plurality of processing tasks to a common reference frame of time to enable the latency values generated using the time values to be accurately accumulated. The processing task timing acquisition module 261 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the processing task timing acquisition module 261.

The processing task latency calculation module 263 generates the latency value corresponding to each of the concurrently executing processing tasks. processing task latency calculation module 263 obtains the start of frame time value and an end of frame time value from the processing task timing acquisition module 261 in which the time values are associated with a data frame (e.g., video data, audio data, augmented reality data, etc.) associated with each concurrently executing processing tasks. Using the start of frame time value and the end of frame time value, the processing task latency calculation module 263 may generate the corresponding latency value as being an amount of time greater than a time value associated with an expected time value needed to process the data frame of the processing task (e.g., video data, audio data, augmented reality data, etc.) to provide a desired quality of service of the processing task. The processing task latency calculation module 263 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the processing task latency calculation module 263.

The processing task latency accumulator module 265 generates the accumulated steady state latency value by accumulated the latency values for the concurrently executing processing tasks for each frame of data processed within the processor. The steady state latency value may be determined by comparing each accumulated latency value from the concurrently executing processing tasks during a sequence of frames of data. When a sequence of frames of data are processed, each frame of data generates an accumulated latency values and the accumulated latency value is considered to be in a steady state when the subsequently generated accumulated latency values are the same value over a plurality of data frames (e.g., video data, audio data, augmented reality data, etc.). The processing task latency accumulator module 265 may be performed by a processing system (e.g., 112, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the processing task latency accumulator module 265.

The clock frequency adjustment module 267 increases and decreases the current operating clock frequency using the accumulated steady state latency value. The current operating clock frequency is increased when it is determined that the accumulated steady state value is too low and/or negative. The current clock operating frequency is decreased when the accumulated steady state latency value is larger than a predetermined value and the current operating clock frequency is greater than the preconfigured minimum clock frequency. The clock frequency adjustment module 267 may be performed by a processing system (e.g., 112, 200, 202, 240, 252, 301) including one or more processors (e.g., 111, 210, 212, 214, 216, 218, 241, 260) configured with processor-executable instructions and/or hardware elements (including hardware configured with firmware), any one or combination of which may be configured to perform any of the operations of the clock frequency adjustment module 267.

Figure 3:
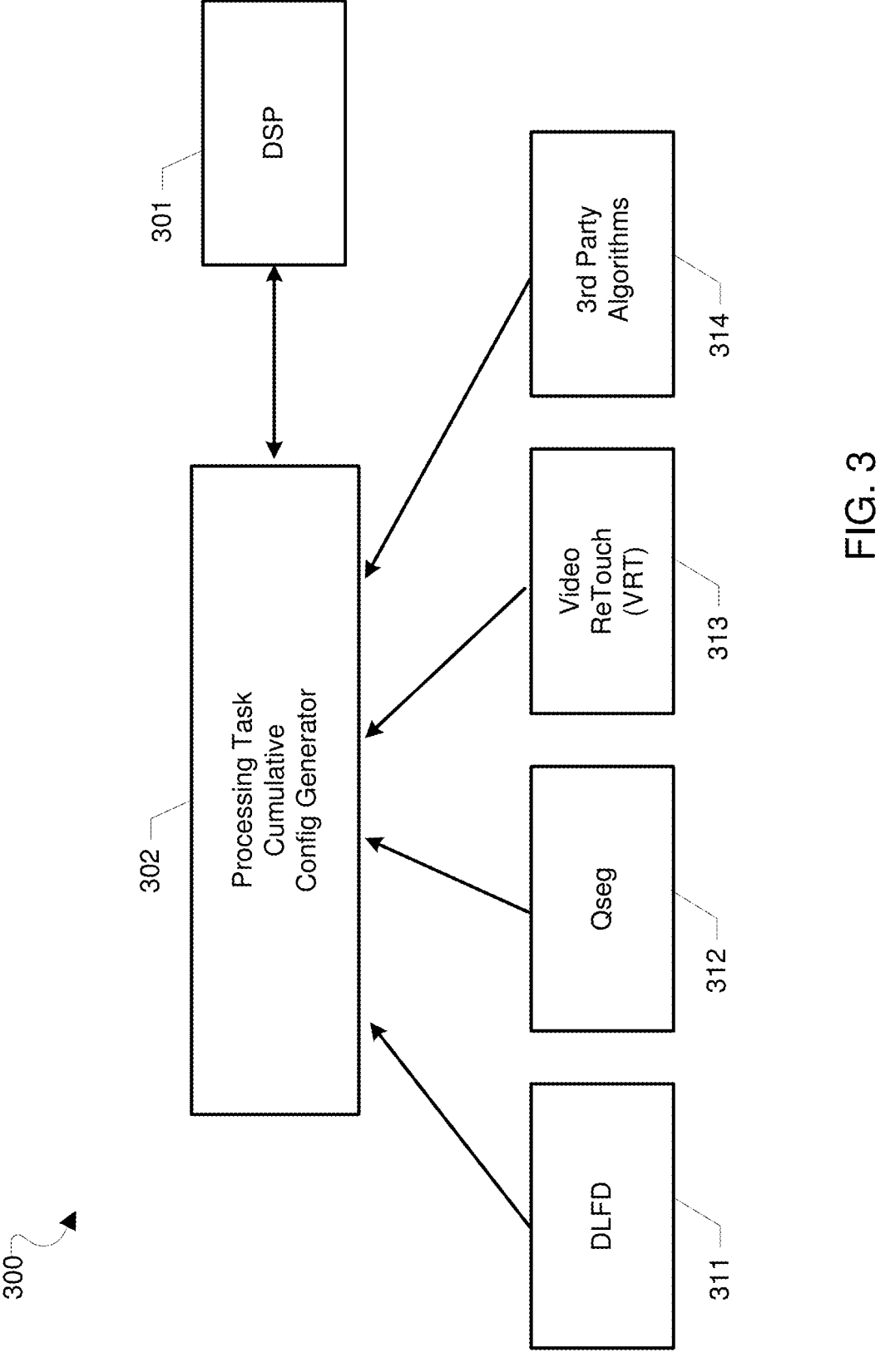
FIG. 3 is a system block diagram illustrating an embodiment of a processing system for use in cumulative latency voting mode for DCVS in accordance with various embodiments.

FIG. 3 is a system block diagram 300 illustrating an embodiment of a processing system including a digital signal processor (DSP) 301 for use in cumulative latency voting mode for DCVS in accordance with various embodiments. In current processing mobile systems 111, a mechanism is not available to monitor operating clock frequency processors that are managed by power management mechanisms. The problem is especially found in mobile devices having a set of concurrently executing tasks in which one or more of the processing tasks are expected to complete processing operations on a frame of data within a prespecified amount of time to satisfy a desired frame rate of a video stream, and any corresponding audio stream, being displayed to a user.

A processing task cumulative configuration generator 302 may be utilized to monitor the set of concurrently executing processing tasks 311-314 that require completion of the processing operations performed by the DSP 301 on its corresponding frame of data within a specified amount of time. The processing throughput of the DSP 301 needed to ensure that the set of processing tasks satisfy the allotted time period depends upon the throughput required to support all of the processing tasks currently executing on the processor. Example processing tasks that may be performed on the DSP 301 may include a Deep Learning Face Detection (DLFD) processing task 311, a Qseg deep learning model for instance segmentation processing task 312, a Video ReTouch (VRT) deep learning-based image tone enhancer processing task 313, and other third-party algorithms 314. The processing task cumulative configuration generator 302 may be performed by a processing system (e.g., 112, 200, 202, 240, 252, 301) including one or more processors (e.g.,

111, 210, 212, 214, 216, 218, 241, 260, 1511, 1602) configured with processor-executable instructions and/or hardware elements (including hardware configured with firmware), any one or combination of which may be configured to perform any of the operations of the processing task cumulative configuration generator processing task cumulative configuration generator 302.

In various embodiments, the computer processing system 112 that utilizes the cumulative latency voting mode for DCVS corresponds to a digital signal processor (DSP). Other types of processors including a generic central processing unit (CPU), a graphics processing unit (GPU), and other types of processing units may utilize the cumulative latency voting mode for DCVS for processing tasks having similar timing requirements (e.g., video tasks, audio tasks, augmented reality tasks, etc.). The processing task cumulative configuration generator 302 obtains operating parameters from each of the processing tasks 311-314 to generate a current operating clock frequency to be used by the computer processing system 112 when these processing tasks are included in the set of concurrently executing processing tasks.

Figure 4:
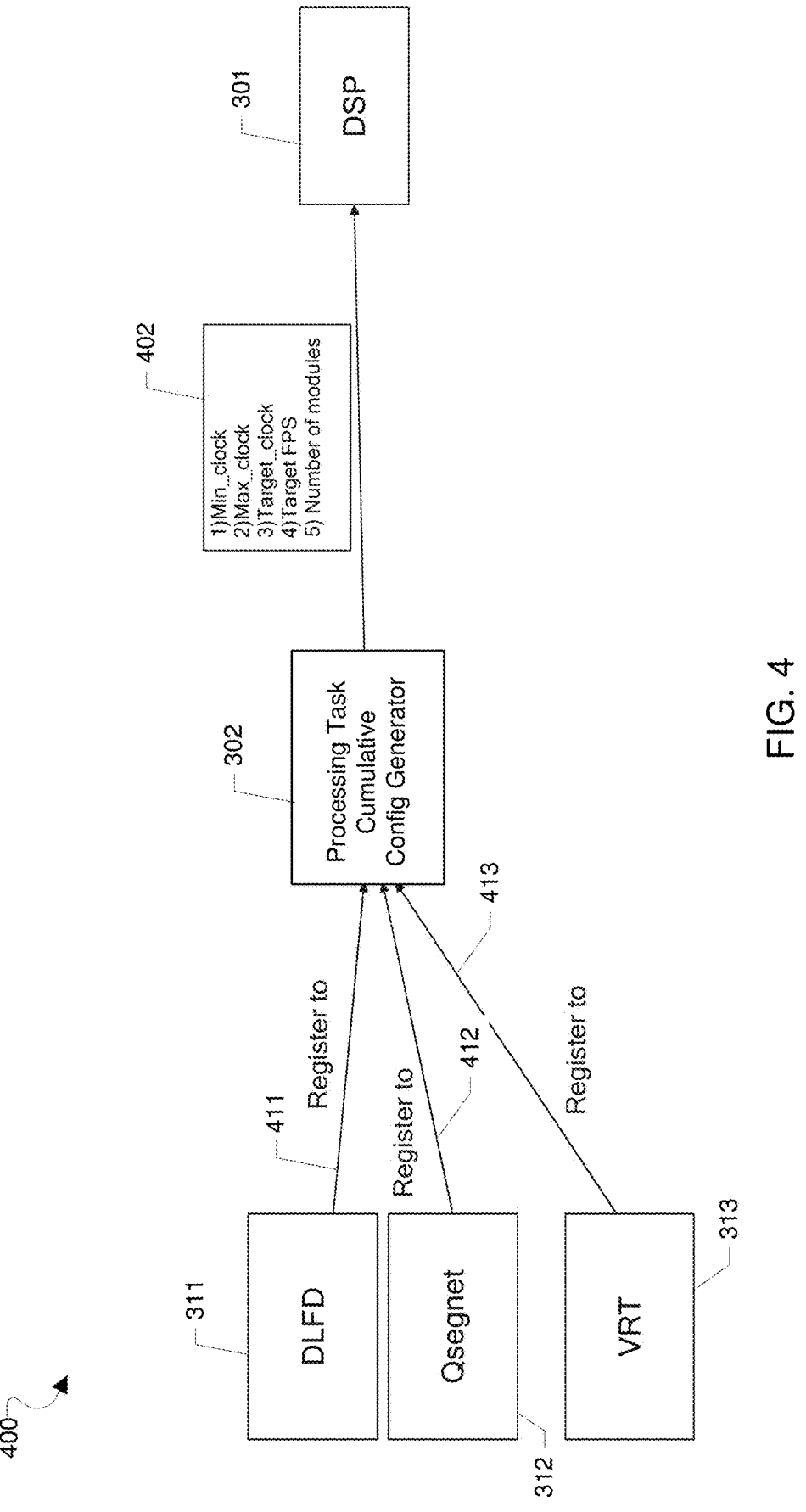
FIG. 4 is a system block diagram illustrating an embodiment for use in cumulative latency voting mode for DCVS in accordance with various embodiments.

FIG. 4 is a system block diagram 400 illustrating an embodiment for use in cumulative latency voting mode for DCVS in accordance with various embodiments. A particular set of processing tasks 311-313 (e.g., video tasks, audio tasks, augmented reality tasks, etc.) are to be concurrently executed on the computer processing system 112 at a particular point in time. Before each processing task 311-313 is instantiated onto the computer processing system 112, each processing task registers 411, 412, 413 with the processing task cumulative configuration generator 302 providing operating parameters defining prespecified timing requirements that the corresponding processing task needs to be satisfied.

The processing task cumulative configuration generator 302 uses the registration of the processing tasks 311-313 to generate an initial value for a currently operating clock frequency that is needed by the processing tasks. The processing task cumulative configuration generator 302 transmits to the computer processing system 112 a set of current operating parameters 402 to be used by the computer processing system 112 to meet the requirements of the processing tasks 311-313 (e.g., video tasks, audio tasks, augmented reality tasks, etc.). The set of current operating parameters 402 includes a minimum clock frequency value, a maximum clock frequency value, a target clock frequency value, a target frame rate value, and a number of concurrently executing processing tasks.

The processing task cumulative configuration generator 302 monitors an observed latency time for each concurrently executing processing tasks 311-313 to determine any updates to the current clock frequency to be applied. The updates to the current clock frequency include an increase on the clock frequency when the total latency of all concurrently executing processing tasks indicates that a quality of service is not being provided at a point in time. The updates to the current clock frequency also include a decrease in the clock (e.g., video tasks, audio tasks, augmented reality tasks, etc.) frequency when the quality of service is being satisfied and the current operating clock frequency is greater than a maximum clock frequency. A reduction in the current operating clock frequency results in a reduction in power consumption for the computer processing system 112. These updates to the current operating clock frequency are periodically repeated until the set of concurrently executing processing tasks 311-313 changes.

The processing task cumulative configuration generator 302 repeats the generation of an initial current operating clock frequency each time a processing task is added to or removed from the set of concurrently executing processing tasks when a processing task is instantiated and terminated. The processing task cumulative configuration generator 302 then continues to monitor the observed latency time for each concurrently executing processing tasks 311-313 until the next change in the set of concurrently executing processing tasks.

Figure 5:
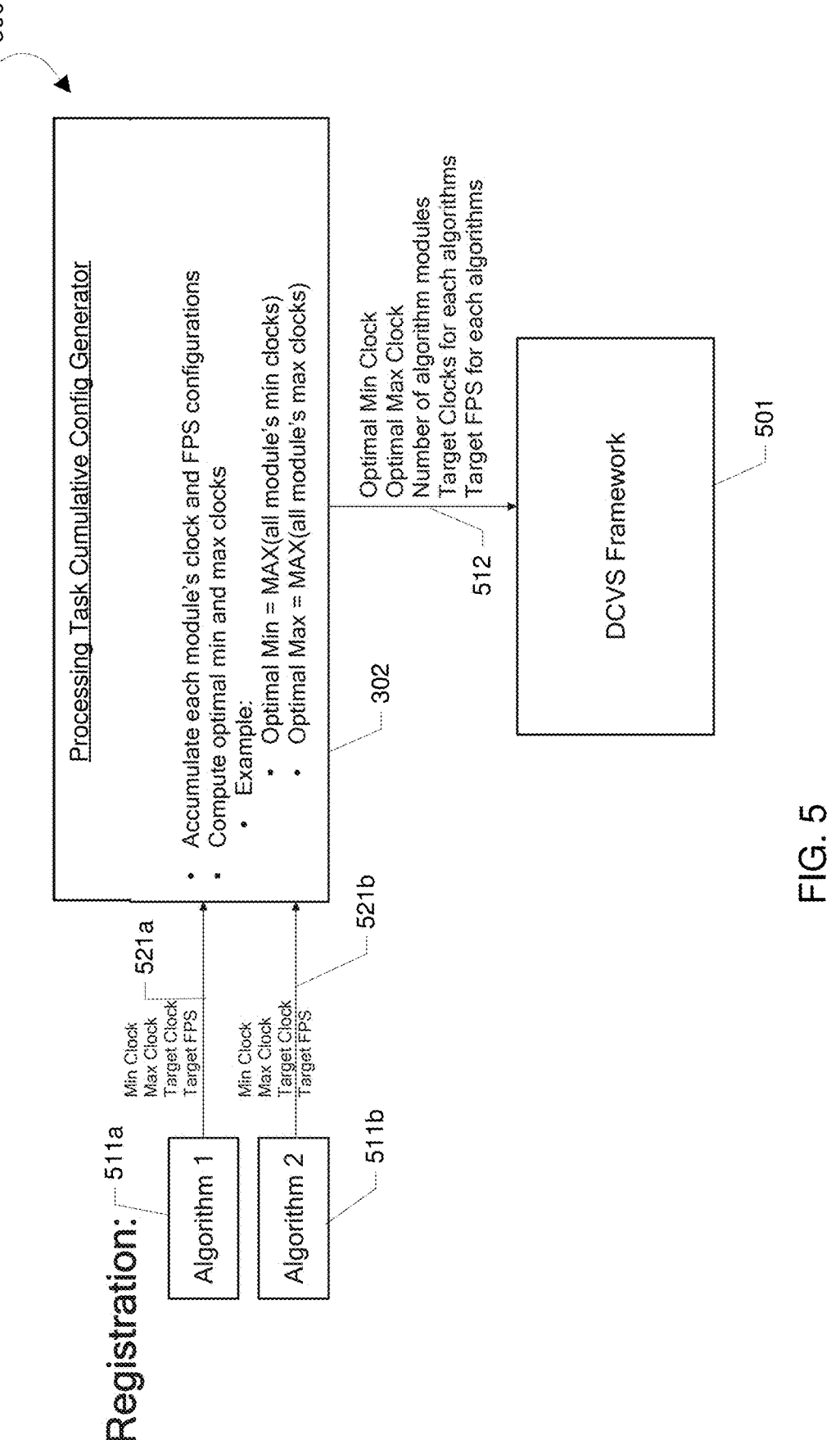
FIG. 5 is a system block diagram illustrating an embodiment of a processor utilizing a DCVS framework for use in cumulative latency voting mode for DCVS in accordance with various embodiments.
Figure 7:
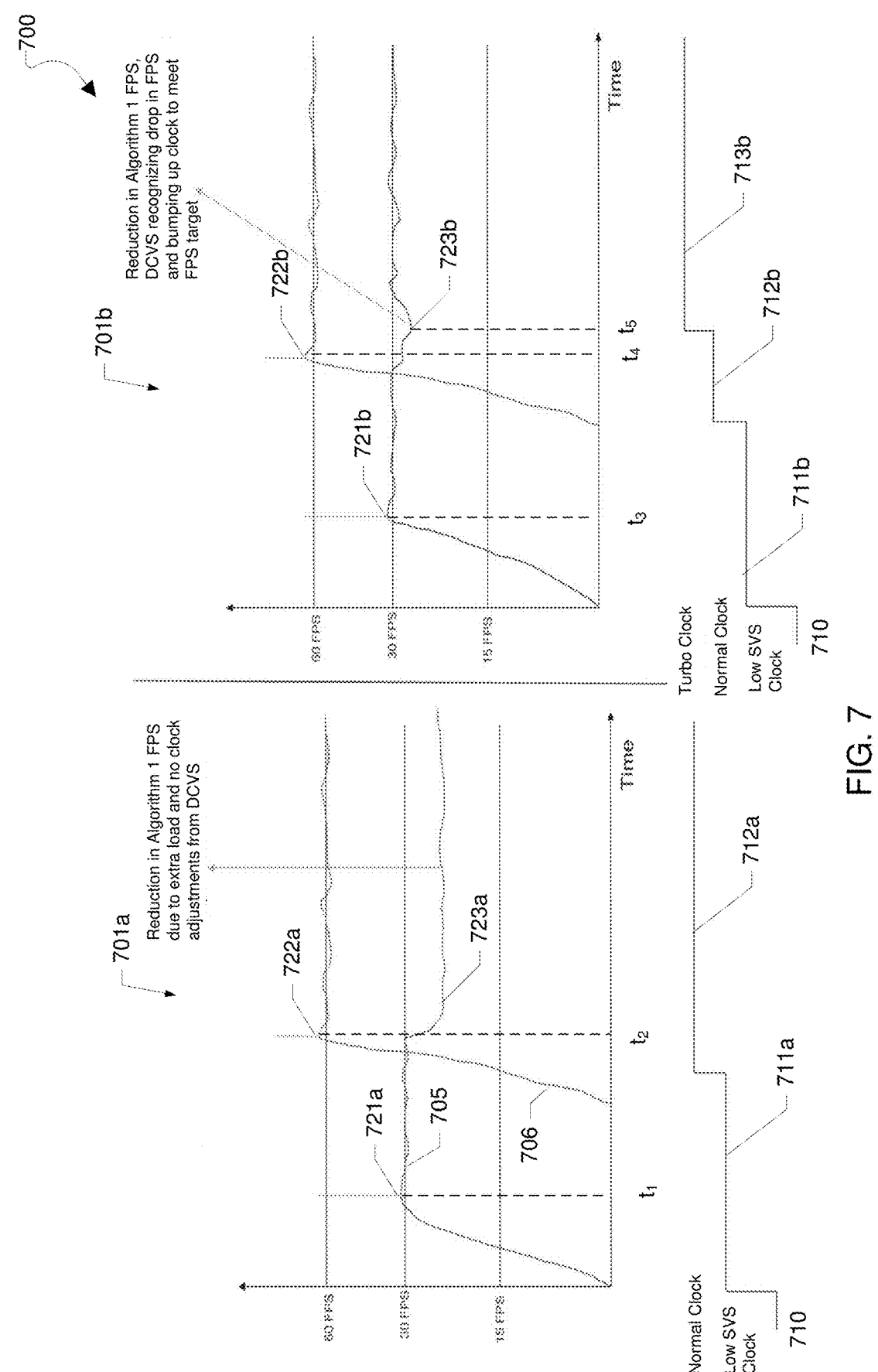
FIG. 7 is a processing load timing diagram illustrating a method utilizing cumulative latency voting mode for DCVS in accordance with various embodiments.

FIG. 5 is a system block diagram 500 illustrating an embodiment of a processor utilizing a DCVS framework for use in cumulative latency voting mode for DCVS in accordance with various embodiments. Registration of one or more processing tasks 511a, 511b occurs when these tasks transmit corresponding sets of operating parameters 521a, 521b to the processing task cumulative configuration generator 302. The processing task cumulative configuration generator 302 generates a set of processor operating parameters 512 for transmission to the DCVS framework 501 used by power management for the computer processing system 112.

The processing task cumulative configuration generator 302 generates the set of processor operating parameters 512 that include a preconfigured minimum clock frequency, a preconfigured maximum clock frequency, a number concurrently executing processing tasks, a target clock frequency for each concurrently executing processing task, and a target frame rate states as frames per second (FPS) for each concurrently executing processing task. The processing task cumulative configuration generator 302 accumulates each concurrently executing processing task's clock frequency and each concurrently executing processing task's FPS configurations. For each concurrently executing processing task, the processing task cumulative configuration generator 302 may compute the processor's:

Preconfigured minimum clock frequency=MAX(all concurrently executing processing task's minimum clock frequencies)

Preconfigured maximum clock frequency=MAX(all concurrently executing processing task's maximum clock frequencies)

The processing task cumulative configuration generator 302 obtains the number concurrently executing processing tasks, the target clock frequency for each concurrently executing processing task, and a target frame rate (FPS) for each concurrently executing processing task from the set of operating parameters 521a-b when tasks register with the processing task cumulative configuration generator 302.

FIG. 6 is a system block diagram 600 illustrating an embodiment of a DCVS framework for use in cumulative latency voting mode for DCVS in accordance with various embodiments. During execution of the set of concurrently executing processing tasks, the processing task cumulative configuration generator 302 obtains a start of frame time value and an end of frame time value 601a-b, 602a-b from each of the concurrently executing processing task and provides these time values to the DCVS framework 501 in the processor power management to control the operating frequency of the processor.

In some embodiments, the latency calculations may be performed within the DCVS framework 501. The DCVS framework 501 is a centralized single logical process executing within a CPU in DSP 301. The DCVS framework 501 may be implemented on other processors in a processing system when the start of frame time value and an end of frame time value $601a$-$b$, $602a$-$b$ are available.

The DCVS framework $501$ uses the start of frame time value (SOF) and the end of frame time value (EOF) $601a$-$b$, $602a$-$b$ from each of the concurrently executing processing task to calculate the following for each processing task context: First, the DCVS framework $501$ may compute a latency value for each processing task using a start of frame (SOF) and an end of frame (EOF) values for each frame of data. For example, the first processing task may generate the following:

> First Processing Task First Latency=(EOF1−SOF1) for the first frame of data;
>
> First Processing Task Second Latency=(EOF2−SOF2) for the second frame of data;
>
> First Processing Task Third Latency=(EOF3−SOF3) for the third frame of data; and so on.

Next, the DCVS framework $501$ may accumulate the calculated latencies for First Processing Task's target frame verification.

The DCVS framework $501$ may repeat the processing for a second processing task:

> Second Processing Task First Latency=(EOF1−SOF1) for the first frame of data;
>
> Second Processing Task Second Latency=(EOF2−SOF2) for the second frame of data;
>
> Second Processing Task Third Latency=(EOF3−SOF3) for the third frame of data; and so on.

These latency values may also be accumulated for the Second Processing task. This process may be repeated for all actively executing processing tasks until each calculated frame rate of the accumulated latencies reaches a steady state (e.g., video tasks, audio tasks, augmented reality tasks, etc.). Each of the steady state latency values may be compared to the corresponding target FPS for each executing processing task to determine whether all of the processing tasks are satisfying their respective target frame rates.

If Cumulative Latency for target FPS is met, and if the current operating clock frequency is higher than target clock frequency, the DCVS framework $501$ bumps down the clock frequency by one step, otherwise the DCVS framework $501$ bumps up the clock frequency by one step and resets the accumulated latency. The entire process may be repeated for the currently executing processing tasks at the updated clock frequency to verify that the updated clock frequency is meeting the target frame rate for the currently executing processing tasks (e.g., video tasks, audio tasks, augmented reality tasks, etc.) and operating at the target clock frequency.

Each accumulated latency value may be computed for each currently executing processing task independently of any other executing processing task and the comparison of the accumulated latency values with the corresponding target frame rate. The DCVS framework $501$ may adjust the clock frequency to attempt to have each comparison result in all target frame rates being met while operating at a clock frequency as close to the target clock frequency as possible in order to minimize power consumption of the processor and meet the target frame rates.

FIG. $7$ is a processing load timing diagram $700$ illustrating a method utilizing cumulative latency voting mode for DCVS in accordance with various embodiments. The processing load timing diagram $700$ includes a first processor frame rate timing diagram $701a$ and a second processor frame rate timing diagram $701b$. Both processor frame rate timing diagrams show a frame rate for a pair of processing tasks ($705$, $706$) executing on a processor. An observed frame rate for each task over time.

In the first processor frame rate timing diagram $701a$, the first processing task $705$, having a target frame rate of 30 fps, initiates execution with an operating clock frequency $710$ set to a first preconfigured clock frequency $711a$ expected to meet the target frame rate of 30 fps. The observed frame rate rises to reach a steady state frame rate of 30 fps at a first point in time $721a$.

Sometime after the first point in time $721a$, the second processing task $706$ also initiates execution on the same processor supporting the first processing task $705$ and having a target frame rate of 60 fps. An observed frame rate for the second processing task $706$ rises to reach a steady state frame rate of 60 fps at a second point in time $722a$. At the second point in time $722a$, the operating clock frequency $710$ is raised to a second preconfigured clock frequency $712a$ expected to meet the target frame rate of 60 fps to support the additional processing to be performed.

In the example of frame rate timing diagram $701a$, the observed frame rate of the first processing task $705$ drops below the target frame rate of 30 fps at time $723a$ as the second preconfigured clock rate $712a$ is not sufficient to permit both the first processing task $705$ and the second processing task $706$ to both meet their respective target frame rates. In this example, the requirements of the first processing task $705$ and the second processing task $706$ are not both met.

In the second processor frame rate timing diagram $701b$, the first processing task $705$ initiates execution with an operating clock frequency set to a third preconfigured clock frequency $711b$ expected to meet the target frame rate of 30 fps, and once again the observed frame rate rising to reach a steady state frame rate of 30 fps at a third point in time $722b$. Sometime after the third point in time $721b$, the second processing task once again initiates execution on the same processor supporting the first processing task $705$. The observed frame rate for the second processing task $706$ again rises to reach a steady state frame rate of 60 fps at a fourth point in time $723b$. After the fourth point in time $723b$, the operating clock frequency $710$ is raised to a fourth preconfigured clock frequency $712b$ resulting in the observed frame rate for the first processing task $705$ once again falls below the target frame rate of 30 fps.

When the observed frame rate of the first processing task $705$ is detected to be below its corresponding target frame rate, the operating clock frequency $710$ may be raised once again to a new operating clock frequency $713b$ at a fifth point in time $723b$. The raised of the operating clock frequency $710$ at the fifth point in time $723b$ causes the observed frame rate for both the first processing task $705$ and second processing tasks $706$ to meet their respective frame rates.

The target frame rates for each processing task may also vary because not all concurrently executing processing tasks have or require similar execution or frame rates. For example, an executing task that is processing video frames of a video stream and a corresponding audio stream may require strict latency requirements and thus impose quality of service demands, while another executing task performing background tasks may have latency requirements that vary over time, including periods with little or no latency requirements when the background tasks do not require a high level of quality of service.

FIG. 8 is a process flow diagram 800 illustrating a method for cumulative latency voting mode for DCVS in accordance with various embodiments. With reference to FIGS. 1-8, the operations of the method 800 may be performed by a processing system (e.g., 112, 200, 202, 240, 252, 301) including one or more processors (e.g., 111, 210, 212, 214, 216, 218, 241, 260) and/or hardware elements, any one or combination of which may be configured to perform any of the operations of the method 800. Further, one or more processors within the processing system may be configured with software or firmware to perform various operations of the method. To encompass any of the processor(s), hardware elements and software elements that may be involved in performing the method 800, the elements performing method operations are referred to as a "processing system." Further, means for performing functions of the method 800 may include the processing system (e.g., 112, 200, 202, 240, 252, 301) including one or more processors (e.g., 111, 210, 212, 214, 216, 218, 241, 260), memory 220, 268, and RF resources 230.

In block 801, the processing system may calculate a first latency value for each frame of data of the first processing task, in which the first latency value may be calculated as the start of frame value minus the end of frame value of the frames of data of the first processing task to determine a first steady state latency. In block 803, the processing system may calculate a second latency value for each frame of data of the second processing task to determine a second steady state latency. The second latency value may be calculated as the start of frame value minus the end of frame value of the frames of data of the second processing task.

In block 805, the processing system may determine whether the first steady state latency satisfies a target frame rate of the first processing task. In block 807, the processing system may determine whether the second steady state latency satisfies a target frame rate of the second processing task.

In block 809, the processing system may adjust the current clock frequency in response to determining that either the first steady state latency or the second steady state latency fails to satisfy the target frame rate for each currently executing processing task.

Figure 9:
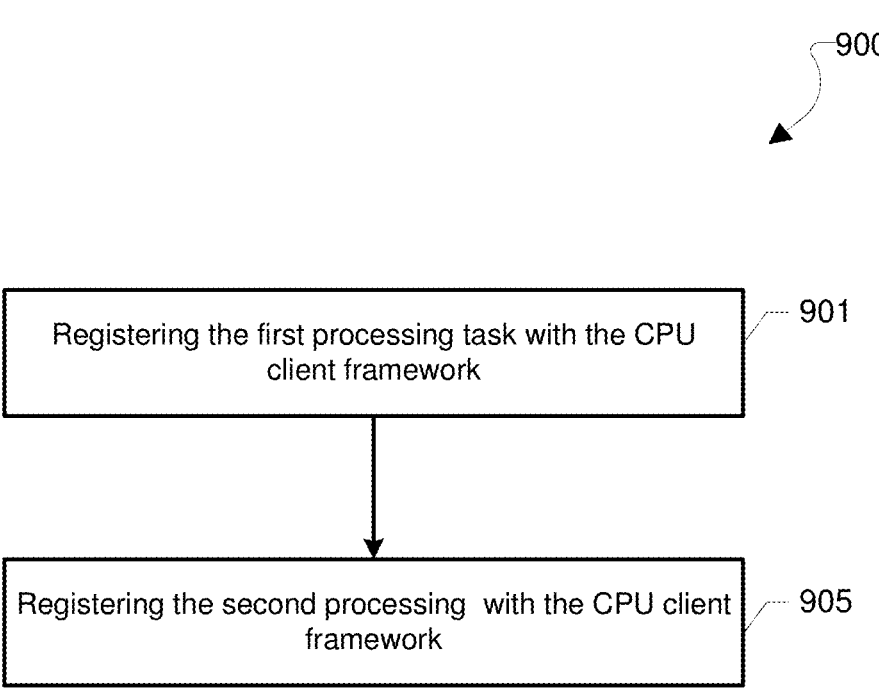
FIG. 9 is a process flow diagram illustrating a method for cumulative latency voting mode for DCVS in accordance with various embodiments.

FIG. 9 is a process flow diagram 900 illustrating a method for cumulative latency voting mode for DCVS in accordance with various embodiments. With reference to FIGS. 1-9, the operations of the method 900 may be performed by a processing system (e.g., 102, 120, 240) including one or more processors (e.g., 111, 260) and/or hardware elements, any one or combination of which may be configured to perform any of the operations of the method 900. Further, one or more processors within the processing system may be configured with software or firmware to perform various operations of the method. To encompass any of the processor(s), hardware elements and software elements that may be involved in performing the method 900, the elements performing method operations are referred to as a "processing system." Further, means for performing functions of the method 900 may include the processing system (e.g., 112, 200, 202, 240, 252, 301) including one or more processors (e.g., 111, 210, 212, 214, 216, 218, 241, 260), memory 220, 268, and RF resources 230.

Method 900 is performed before a processing task is performed by computer processing system 112 by registering the first processing task with the CPU client framework in block 901 and registering the second processing task with the CPU client framework in block 905. Once a processing task is registered, the processing task may be executed using the method 800.

FIG. 10 is a process flow diagram 1000 illustrating a method for cumulative latency voting mode for DCVS in accordance with various embodiments. With reference to FIGS. 1-10, the operations of the method 1000 may be performed by a processing system (e.g., 112, 200, 202, 240, 252, 301) including one or more processors (e.g., 111, 210, 212, 214, 216, 218, 241, 260) and/or hardware elements, any one or combination of which may be configured to perform any of the operations of the method 1000. Further, one or more processors within the processing system may be configured with software or firmware to perform various operations of the method. To encompass any of the processor(s), hardware elements and software elements that may be involved in performing the method 1000, the elements performing method operations are referred to as a "processing system." Further, means for performing functions of the method 1000 may include the processing system (e.g., 112, 200, 202, 240, 252, 301) including one or more processors (e.g., 210, 212, 214, 216, 218, 241, 260, 1511, 1602), memory 220, 268, and RF resources 230.

In block 1001, processing system may determine a preconfigured minimum clock frequency and a preconfigured maximum clock frequency using a first set of operating parameters of a first processing task and a second set of operating parameters of a second processing task, in which the first and second processing tasks are executing concurrently.

In block 1003, the processing system may initiate execution of the first processing task and the second processing task utilizing the DCVS framework using a current clock frequency equal to a target clock frequency, in which the target clock frequency is between the preconfigured minimum clock frequency and the preconfigured maximum clock frequency. In block 1005, the processing system may obtain a first start of frame time value and a first end of frame time value for the first processing task.

The processing system may obtain a second start of frame time value and a second end of frame time value for the second processing task in block 1007. In block 1009, the processing system may calculate the first latency value for the first processing task using a first start of frame and a first end of frame and determine the second latency value for the processing learning task using a second start of frame and a second end of frame.

FIG. 11 is a process flow diagram 1100 illustrating a method for cumulative latency voting mode for DCVS in accordance with various embodiments. With reference to FIGS. 1-11, the operations of the method 1100 may be performed by a processing system (e.g., 112, 200, 202, 240, 252, 301) including one or more processors (e.g., 210, 212, 214, 216, 218, 241, 260, 1511, 1602) and/or hardware elements, any one or combination of which may be configured to perform any of the operations of the method 1100. Further, one or more processors within the processing system may be configured with software or firmware to perform various operations of the method. To encompass any of the processor(s), hardware elements and software elements that may be involved in performing the method 1100, the elements performing method operations are referred to as a "processing system." Further, means for performing functions of the method 1100 may include the processing system (e.g., 112, 200, 202, 240, 252, 301) including one or more processors (e.g., 210, 212, 214, 216, 218, 241, 260, 1511, 1602), memory 220, 268, and RF resources 230.

In block 1101, the processing system may determine the target frame rate of block 809 for each currently executing processing task is not satisfied based on the accumulated latency value for each currently executing processing task with the computer processing system 112. In block 1103, the processing system may increase the current clock frequency in response to determining that the target frame rate of the first processing task is not satisfied or in response to determining that the target frame rate of the second processing task is not satisfied. In block 1105, the processing system may reset the first latency value and the second latency value used to determine the first and second steady state latency.

FIG. 12 is a process flow diagram 1200 illustrating a method for cumulative latency voting mode for DCVS in accordance with various embodiments. With reference to FIGS. 1-12, the operations of the method 1200 may be performed by a processing system (e.g., 112, 200, 202, 240, 252, 301) including one or more processors (e.g., 210, 212, 214, 216, 218, 241, 260, 1511, 1602) and/or hardware elements, any one or combination of which may be configured to perform any of the operations of the method 1200. Further, one or more processors within the processing system may be configured with software or firmware to perform various operations of the method. To encompass any of the processor(s), hardware elements and software elements that may be involved in performing the method 1200, the elements performing method operations are referred to as a "processing system." Further, means for performing functions of the method 1200 may include the processing system (e.g., 112, 200, 202, 240, 252, 301) including one or more processors (e.g., 210, 212, 214, 216, 218, 241, 260, 1511, 1602), memory 220, 268, and RF resources 230.

The method 1200 further defines adjusting the current clock frequency in response to determining that either the first steady state latency or the second steady state latency fails to satisfy the target frame rate of block 809. In block 1201, the processing system 112 may determine whether the target frame rate of the first processing task is satisfied based on the first latency value. In block 1203, the processing system may determine whether the target frame rate of the second processing task is satisfied based on the second latency value. In block 1205, the processing system may determine whether the current clock frequency is higher than the target clock frequency in block 1205.

In block 1207, the processing system 112 may decrease the current clock frequency in response to determining that the target rate of the first processing task is satisfied, that the target frame rate of the second processing task is satisfied, and that the current clock frequency is greater than the target clock frequency.

Figure 13:
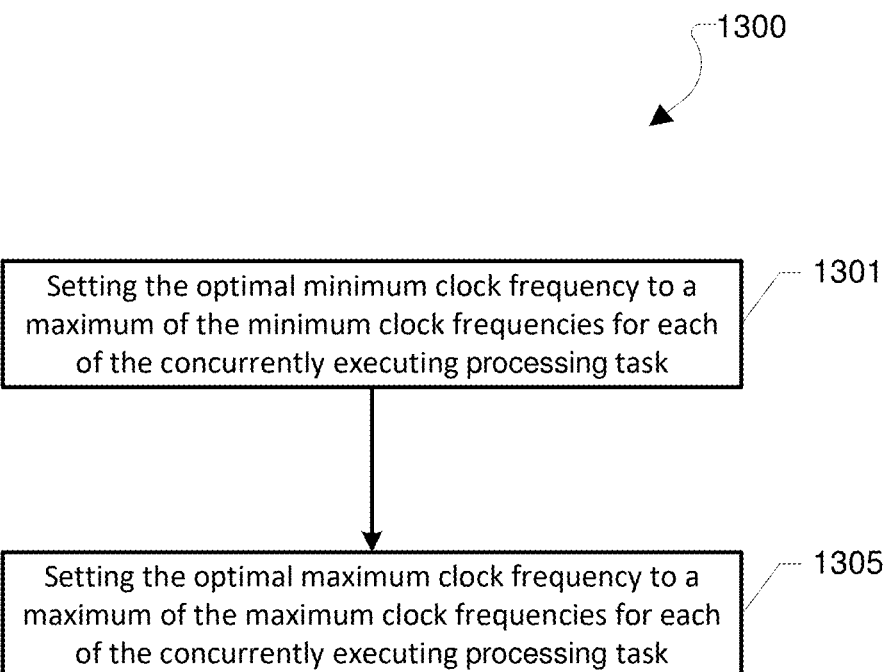
FIG. 13 is a process flow diagram illustrating a method for cumulative latency voting mode for DCVS in accordance with various embodiments.

FIG. 13 is a process flow diagram 1300 illustrating a method for cumulative latency voting mode for DCVS in accordance with various embodiments. With reference to FIGS. 1-13, the operations of the method 1300 may be performed by a processing system (e.g., 112, 200, 202, 240, 252, 301) including one or more processors (e.g., 210, 212, 214, 216, 218, 241, 260, 1511, 1602) and/or hardware elements, any one or combination of which may be configured to perform any of the operations of the method 1300. Further, one or more processors within the processing system may be configured with software or firmware to perform various operations of the method. To encompass any of the processor(s), hardware elements and software elements that may be involved in performing the method 1300, the elements performing method operations are referred to as a "processing system." Further, means for performing functions of the method 1300 may include the processing system (e.g., 200, 202, 240, 252, 301) including one or more processors (e.g., 210, 212, 214, 216, 218, 241, 260, 1511, 1602), memory 220, 268, and RF resources 230.

Method 1300 further defines the determining the preconfigured minimum clock frequency and the preconfigured maximum clock frequency. In block 1301, the processing system may set the preconfigured minimum clock frequency to a maximum of the minimum clock frequencies for each of the concurrently executing processing tasks. In block 1305, the processing system may set the preconfigured maximum clock frequency to a maximum of the maximum clock frequencies for each of the concurrently executing processing tasks.

Figure 14:
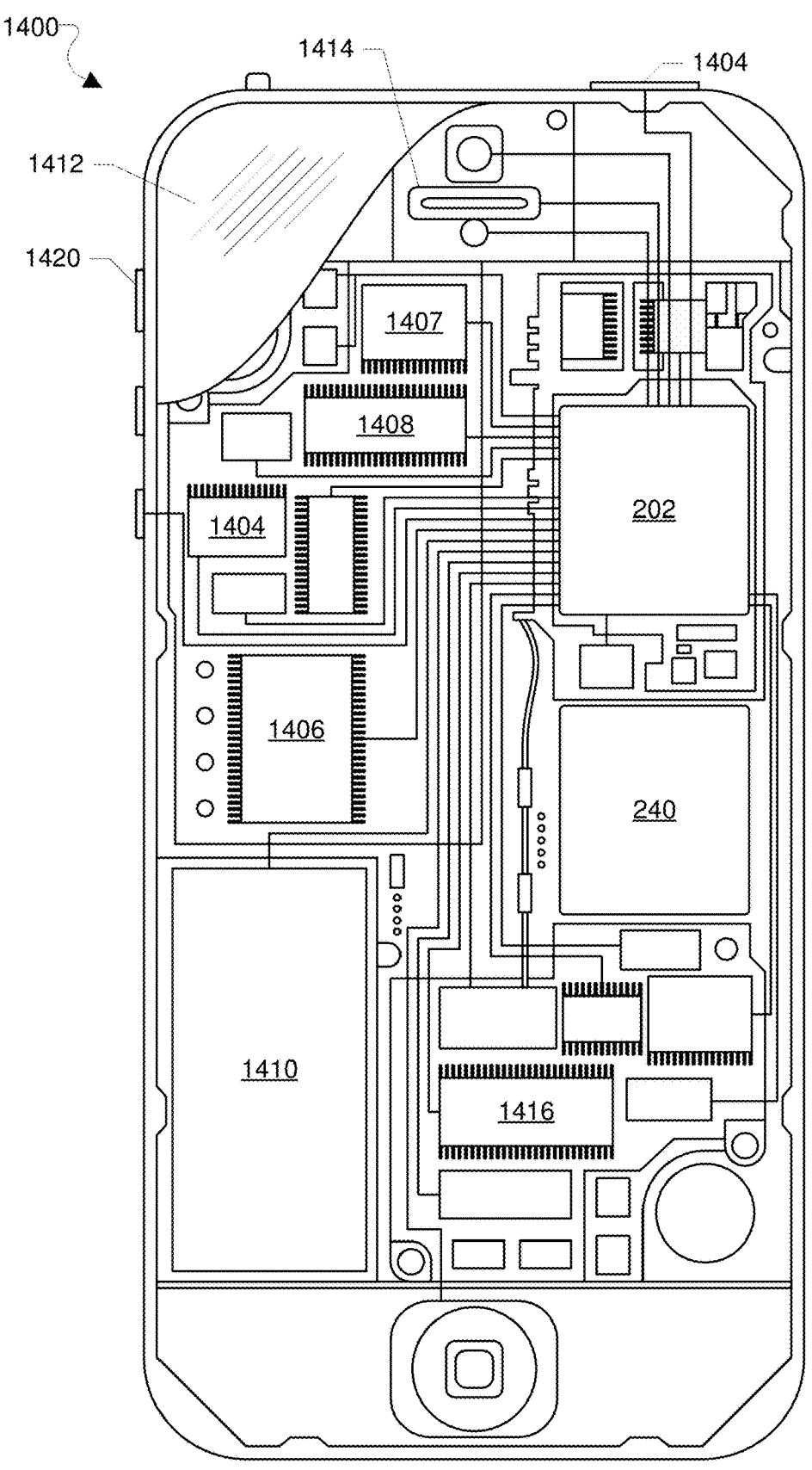
FIG. 14 is a component diagram of a computing device including a smartphone computer suitable for use with the various embodiments.

Various embodiments (including, but not limited to, the embodiments discussed above with reference to FIGS. 8-13) may be implemented on a variety of computing devices (e.g., the mobile device 101, 102, and 103), an example of which is illustrated in FIG. 14 in the form of a smartphone 1400. With reference to FIGS. 1-14, the smartphone 1400 may include a first SOC 202 (e.g., a SOC-CPU) coupled to a second SOC 240. The first and second SOCs 202, 240 may be powered by a battery 1410 coupled to internal memory 1406, 1416, a display 1412, and to a speaker 1414. Additionally, the smartphone 1400 may include an antenna 1404 for sending and receiving electromagnetic radiation that may be connected to a wireless data link and/or cellular telephone transceiver 1408 coupled to one or more processors in the first and/or second SOCs 202, 240. Smartphones 1400 typically also include menu selection buttons 1420 for receiving user inputs.

A typical smartphone 1400 also includes a sound encoding/decoding (CODEC) circuit 1407, which digitizes sound received from a microphone into data packets suitable for wireless transmission and decodes received sound data packets to generate analog signals that are provided to the speaker to generate sound. Also, one or more of the processors in the first and second SOCs 202, 240, wireless transceiver 1408 and CODEC 1407 may include a digital signal processor (DSP) circuit (not shown separately).

The processing system of a smartphone 1400 may include any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 240 dedicated to wireless communication functions and one processor within an SOC 202 dedicated to running other applications. Typically, software applications may be stored in memory 1406, 1416 before they are accessed and loaded into the processor. The processors may include internal memory sufficient to store the application software instructions.

Figure 15:
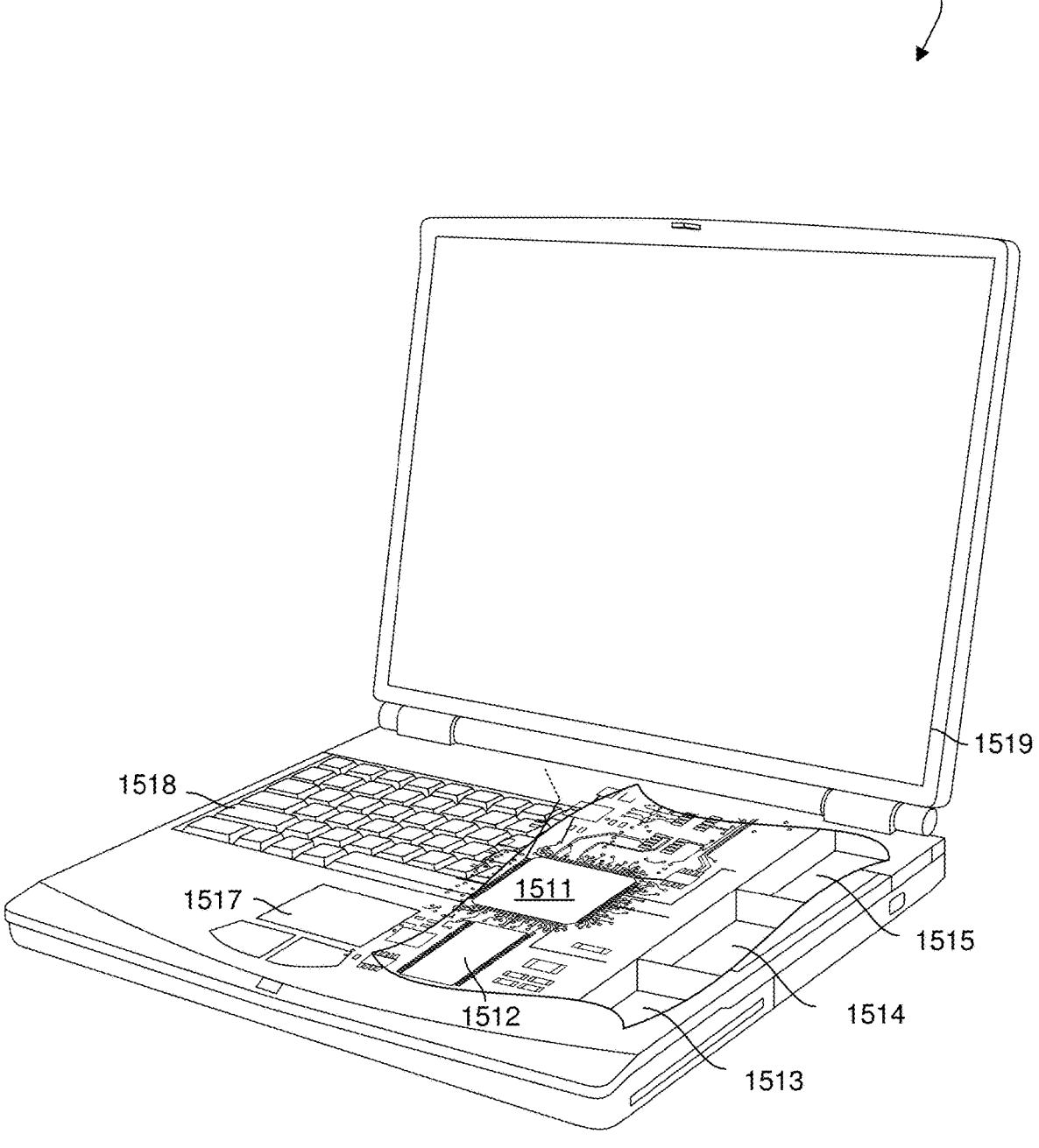
FIG. 15 is a component diagram of a computing device including a laptop computer suitable for use with the various embodiments.

Various embodiments (including, but not limited to, the embodiments discussed above with reference to FIGS. 8-13) may also be implemented within a variety of personal computing devices, an example 1500 of which is illustrated in FIG. 15. With reference to FIGS. 1-15, the laptop computer 1500 (which may correspond, for example, to the computing devices 102, 200 in FIGS. 1-2) may include a touchpad touch surface 1517 that serves as the computer's pointing device, and thus may receive drag, scroll, and flick gestures similar to those implemented on computing devices equipped with a touchscreen display as described. A laptop computer 1500 will typically include a processor 1511 coupled to volatile memory 1512 and a large capacity nonvolatile memory, such as a disk drive 1513 of Flash memory. The laptop computer 1500 may also include a floppy disc drive 1514 and a compact disc (CD) drive 1515 coupled to the processor 1511. The computer 1500 may also include a number of connector ports coupled to the processor 1511 for establishing data connections or receiving external memory devices, such as a USB™ or FIREWIRE® connector sockets, or other network connection circuits for coupling the processor 1511 to a network. In a notebook configuration, the computer housing includes the touchpad 1517, the keyboard 1518, and the display 1519 all coupled to the processor 1511. Other configurations of the computing device may include a computer mouse or trackball coupled to the processor (e.g., via a USB™ input) as are well known, which may also be used in conjunction with various embodiments.

Figure 16:
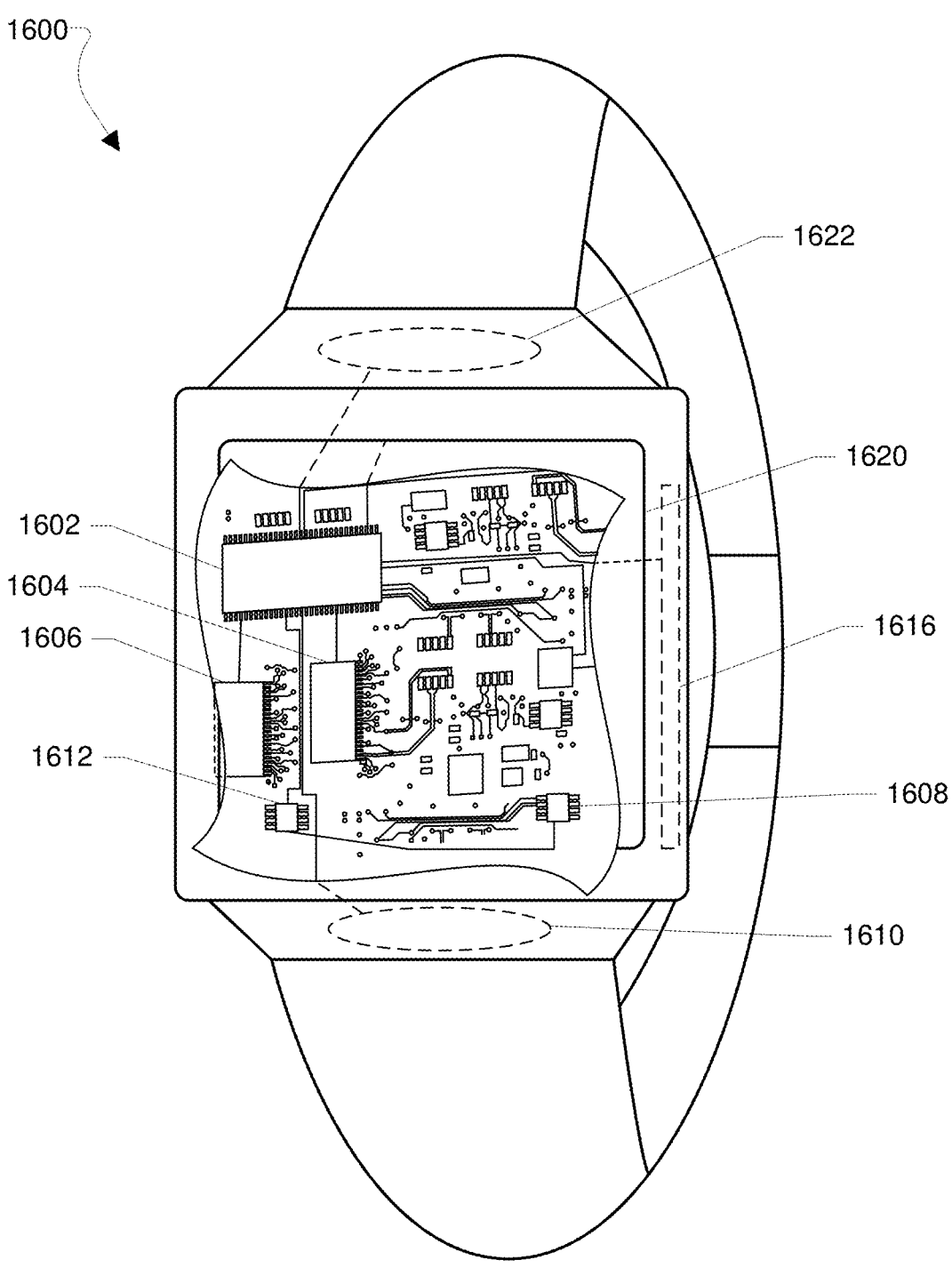
FIG. 16 is a component diagram of a wearable computing device including a small touchscreen suitable for use with the various embodiments.

The various embodiments (including, but not limited to, the embodiments discussed above with reference to FIGS. 8-13) may be implemented within a variety of computing devices, such as a wearable computing device. FIG. 16 illustrates an example wearable computing device in the form of a smart watch 1600. A smart watch 1600 may include a processor 1602 coupled to internal memories 1604 and 1606. Internal memories 1604 and 1606 may be volatile or non-volatile memories and may also be secure and/or encrypted memories, or unsecured and/or unencrypted memories, or any combination thereof. The processor 1602 may also be coupled to a touchscreen display 1620, such as a resistive-sensing touchscreen, capacitive-sensing touchscreen infrared sensing touchscreen, or the like. Additionally, the smart watch 1600 may have one or more antenna 1608 for sending and receiving electromagnetic radiation that may be connected to one or more wireless data links 1612, such as one or more BLUETOOTH® transceivers, Peanut transceivers, Wi-Fi transceivers, ANT+ transceivers, etc., which may be coupled to the processor 1602. The smart watch 1600 may also include physical virtual buttons 1622 and 1610 for receiving user inputs as well as a slide sensor 1616 for receiving user inputs.

With reference to FIGS. 1-16, the processing system 202, 1511, and 1602 may include any programmable processor, microprocessor, microcomputer or multiple processor chip or chips that can be configured by software instructions (applications) to perform a variety of functions, including the functions of various embodiments as described. In some devices, multiple processors may be provided, such as one processor dedicated to wireless communication functions and one processor dedicated to running other applications. Typically, software applications may be stored in the internal memory 1406, 1512, and 1602 before they are accessed and loaded into the processors 202, 1511, and 1602. The processors 202, 1511, and 1602 may include internal memory sufficient to store the application software instructions. In many devices the internal memory may be a volatile or nonvolatile memory, such as flash memory, or a mixture of both. For the purposes of this description, a general reference to memory refers to memory accessible by the processors 202, 1511, and 1602, including internal memory or removable memory plugged into the device and memory within processors 202, 1511, and 1602, themselves.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

Implementation examples are described in the following paragraphs. While some of the following implementation examples are described in terms of example methods, further example implementations may include the example methods discussed in the following paragraphs implemented by a mobile devices 101, 102, and 103 including a processor configured with processor-executable instructions to perform operations of the methods of the following implementation examples; example methods discussed in the following paragraphs implemented by a mobile devices 101, 102, and 103 including means for performing functions of the methods of the following implementation examples; and example methods discussed in the following paragraphs may include by a mobile devices 101, 102, and 103 that may be implemented as a non-transitory processor-readable storage medium having stored thereon processor-executable instructions configured to cause a processors 202, 240, 1602 to perform the operations of the methods of the following implementation examples.

Example 1. A method for managing an active clock frequency of a processing system having a CPU client framework and a dynamic clock and voltage scaling (DCVS) framework, including: calculating a first latency value for each frame of data of the first processing task to determine a first steady state latency, the first latency value being a start of frame value minus an end of frame value of the frames of data of the first processing task; calculating a second latency value for each frame of data of the second processing task to determine a second steady state latency, the second latency value being the start of frame value minus the end of frame value of the frames of data of the second processing task; determining whether the first steady state latency satisfies a target frame rate of the first processing task; determining whether the second steady state latency satisfies a target frame rate of the second processing task and adjusting the current clock frequency in response to determining that either the first steady state latency or the second steady state latency fails to satisfy the target frame rate for each currently executing processing task.

Example 2. The method of example 1, further including: registering the first processing task with the CPU client framework; and registering the second processing task with the CPU client framework.

Example 3. The method of either of examples 1 or 2, further including: determining a preconfigured minimum clock frequency and a preconfigured maximum clock frequency using a first set of operating parameters of a first processing task and a second set of operating parameters of a second processing task, in which the first and second processing tasks are executing concurrently; initiating execution of the first processing task and the second processing task utilizing the DCVS framework using a current clock frequency equal to a target clock frequency, in which the target clock frequency is between the preconfigured minimum clock frequency and the preconfigured maximum clock frequency; obtaining a first start of frame time value and a first end of frame time value for the first processing task; obtaining a second start of frame time value and a second end of frame time value for the second processing task; and determining the first latency value for the first processing task using a first start of frame and a first end of frame and determining the second latency value for the second processing task using a second start of frame and a second end of frame.

Example 4. The method of example 3, in which the first set of operating parameters for the first processing task and the second set of operating parameters for the second processing task each include a minimum clock frequency, a maximum clock frequency, a target clock frequency, and a target frame rate.

Example 5. The method of example 4, in which adjusting the current clock frequency in response to determining that either the first steady state latency or the second steady state latency fails to satisfy the target frame rate for each currently executing processing task includes: determining whether the target frame rate for each currently executing processing task is not satisfied based on the accumulated latency value for each currently executing processing task; increasing the current clock frequency in response to determining that the target frame rate for each currently executing processing task is not satisfied or in response to determining that the target frame rate for each currently executing processing task is not satisfied; and resetting the accumulated latency value for each currently executing processing task used to determine the first and second steady state latency.

6. The method of example 4, in which adjusting the current clock frequency in response to determining that either the first steady state latency or the second steady state latency fails to satisfy the target frame rate includes: determining whether the target frame rate of the first processing task is satisfied based on the first latency value; determining whether the target frame rate of the second processing task is satisfied based on the second latency value; determining whether the current clock frequency is higher than the target clock frequency; and decreasing the current clock frequency in response to determining that the target frame rate of the first processing task is satisfied, that the target frame rate of the second processing task is satisfied, and that the current clock frequency is greater than the target clock frequency.

Example 7. The method of example 4, in which determining an preconfigured minimum clock frequency and an preconfigured maximum clock frequency utilizes the minimum clock frequency of the first processing task, the maximum clock frequency of the first processing task, the target clock frequency of the first processing task, the target frame rate for the first processing task, the minimum clock frequency of the second processing task, the maximum clock frequency of the second processing task, the target clock frequency for the second processing task, the target frame rate for the second processing task, and a number of concurrently executing processing tasks.

Example 8. The method of example 7, in which determining the preconfigured minimum clock frequency and the preconfigured maximum clock frequency including: setting the preconfigured minimum clock frequency to a maximum value of the minimum clock frequencies for each of the number of concurrently executing processing tasks; and setting the preconfigured maximum clock frequency to a maximum value of the maximum clock frequencies for each of the concurrently executing processing tasks.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 800, 900, 1000, 1100, 1200, and/or 1300 may be substituted for or combined with one or more operations of the methods 800, 900, 1000, 1100, 1200, and/or 1300.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processing system may also be implemented as a combination of multiple types of processors, such as a combination of a DSP and a processor, a plurality of processors, one or more processors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, Flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to other embodiments without departing from the spirit or scope of the various embodiments. Thus, the various embodiments are not intended to be limited to the embodiments shown herein but are to be accorded the widest scope consistent with the following claims and the principles and novel features disclosed herein.

What is claimed is:

1. A method for managing an active clock frequency of a processing system having a central processing unit (CPU) client framework and a dynamic clock and voltage scaling (DCVS) framework, comprising:

calculating a first latency value for each frame of data of a first processing task, the first latency value being based on a start of frame value minus an end of frame value of the frames of data of the first processing task;

calculating a second latency value for each frame of data of a second processing task, the second latency value being based on the start of frame value minus the end of frame value of the frames of data of the second processing task;

determining whether the first latency value satisfies a target frame rate of the first processing task to generate a latency outcome indicating whether the first processing task satisfies the target frame rate, the latency outcome being independent of the second processing task;

determining whether the second latency value satisfies a target frame rate of the second processing task to generate a further latency outcome indicating whether the second processing task satisfies the target frame rate, the further latency outcome being independent of the first processing task; and adjusting a current clock frequency of the processing system based on cumulative latency voting, wherein the latency outcome and further latency outcome correspond to votes representing task-specific latency satisfaction determinations used in the cumulative latency voting, the current clock frequency being increased when the cumulative latency voting indicates that either the first processing task or the second processing task fails to satisfy its respective target frame rate and decreased only when the cumulative latency voting indicates both the first processing task and the second processing task satisfy their respective target frame rates, wherein the first and second processing tasks are heterogeneous task types executed concurrently by the processing system.

2. The method of claim 1 further comprising:

registering the first processing task with the CPU client framework; and registering the second processing task with the CPU client framework.

3. The method of claim 1 further comprising:

determining a preconfigured minimum clock frequency and a preconfigured maximum clock frequency using a first set of operating parameters of a first processing task and a second set of operating parameters of a second processing task, wherein the first and second processing tasks are executing concurrently;

initiating execution of the first processing task and the second processing task utilizing the DCVS framework using a current clock frequency equal to a target clock frequency, wherein the target clock frequency is between the preconfigured minimum clock frequency and the preconfigured maximum clock frequency;

obtaining a first start of frame time value and a first end of frame time value for the first processing task;

obtaining a second start of frame time value and a second end of frame time value for the second processing task; and determining the first latency value for the first processing task using a first start of frame and a first end of frame and determining the second latency value for the second processing task using a second start of frame and a second end of frame.

4. The method of claim 3, wherein the first set of operating parameters for the first processing task and the second set of operating parameters for the second processing task each comprise a minimum clock frequency, a maximum clock frequency, a target clock frequency, and a target frame rate.

5. The method of claim 4, wherein:

the first latency value is based on an accumulated latency value for the first processing task;

the second latency value is based on an accumulated latency value for the second processing task; and the method further comprises resetting the accumulated latency values for the first processing task and the second processing task after adjusting the current clock frequency.

6. The method of claim 4, wherein:

the first latency value of the first processing task is based on a steady-state latency value for the first processing task; and the second latency value of the second processing task is based on a steady state latency value for the second processing task.

7. The method of claim 4, wherein determining the preconfigured minimum clock frequency and the preconfigured maximum clock frequency utilizes a minimum clock frequency of the first processing task, a maximum clock frequency of the first processing task, the target clock frequency of the first processing task, the target frame rate for the first processing task, a minimum clock frequency of the second processing task, the maximum clock frequency of the second processing task, the target clock frequency for the second processing task, the target frame rate for the second processing task, and a number of concurrently executing processing tasks.

8. The method of claim 7, wherein determining the preconfigured minimum clock frequency and the preconfigured maximum clock frequency comprising:

setting the preconfigured minimum clock frequency to a maximum value of the minimum clock frequencies for each of the number of concurrently executing processing tasks; and setting the preconfigured maximum clock frequency to a maximum value of the maximum clock frequencies for each of the concurrently executing processing tasks.

9. A computing device, comprising:

a memory; and a processing system coupled to the memory and including at least one processor configured to:

calculate a first latency value for each frame of data of the first processing task, the first latency value being based on a start of frame value minus an end of frame value of the frames of data of the first processing task;

calculate a second latency value for each frame of data of the second processing task, the second latency value being based on the start of frame value minus the end of frame value of frames of data of the second processing task;

determine whether the first latency value satisfies a target frame rate of the first processing task to generate a latency outcome indicating whether the first processing task satisfies the target frame rate, the latency outcome being independent of the second processing task;

determine whether the second latency value satisfies a target frame rate of the second processing task to generate a further latency outcome indicating whether the second processing task satisfies the target frame rate, the further latency outcome being independent of the first processing task; and adjust a current clock frequency of the processing system based on cumulative latency voting, wherein the latency outcome and further latency outcome correspond to votes representing task-specific latency satisfaction determinations used in the cumulative latency voting, the current clock frequency being increased when the cumulative latency voting indicates that either the first processing task or the second processing task fail to satisfy its respective target frame rate and decreased only when the cumulative latency voting indicates both the first processing task and the second processing task satisfy their respective target frame rates, wherein the first and second processing tasks are heterogeneous task types executed concurrently by the processing system.

10. The computing device of claim 9, wherein the at least one processor is further configured to:

register the first processing task with the DCVS circuit; and register the second processing task with the DCVS circuit.

11. The computing device of claim 9, wherein the at least one processor is further configured to:

determine a preconfigured minimum clock frequency and a preconfigured maximum clock frequency using a first set of operating parameters of a first processing task and a second set of operating parameters of a second processing task, wherein the first and second processing tasks are executing concurrently;

initiate execution of the first processing task and the second processing task utilizing a DCVS circuit using a current clock frequency equal to a target clock frequency, wherein the target clock frequency is between the preconfigured minimum clock frequency and the preconfigured maximum clock frequency;

obtain a first start of frame time value and a first end of frame time value for the first processing task;

obtain a second start of frame time value and a second end of frame time value for the second processing task; and determine the first latency value for the first processing task using a first start of frame and a first end of frame and determining the second latency value for the second processing task using a second start of frame and a second end of frame.

12. The computing device of claim 11, wherein the first set of operating parameters for the first processing task and the second set of operating parameters for the second processing task each comprise a minimum clock frequency, a maximum clock frequency, a target clock frequency, and a target frame rate.

13. The computing device of claim 12, wherein:

the first latency value is based on an accumulated latency value for the first processing task;

the second latency value is based on an accumulated latency value for the second processing task; and the at least one processor is further configured to reset the accumulated latency values for the first processing task and the second processing task after adjusting the current clock frequency.

14. The computing device of claim 12, wherein:

the first latency value is based on a steady-state latency value for the first processing task; and the second latency value is based on a steady-state latency value for the second processing task.

15. The computing device of claim 12, wherein the at least one processor is further configured to determine the preconfigured minimum clock frequency and the preconfigured maximum clock frequency utilizing the minimum clock frequency of the first processing task, the maximum clock frequency of the first processing task, the target clock frequency of the first processing task, the target frame rate for the first processing task, the minimum clock frequency of the second processing task, the maximum clock frequency of the second processing task, the target clock frequency for the second processing task, the target frame rate for the second processing task, and a number of concurrently executing processing tasks.

16. The computing device of claim 15, wherein the at least one processor is further configured to determine the preconfigured minimum clock frequency and the preconfigured maximum clock frequency by:

setting the preconfigured minimum clock frequency to a maximum value of the minimum clock frequencies for each of the number of concurrently executing processing tasks; and setting the preconfigured maximum clock frequency to a maximum value of the maximum clock frequencies for each of the concurrently executing processing tasks.

17. A non-transitory processor-readable medium having stored thereon processor-executable instructions configured to cause a processor of a computing device to perform operations comprising:

calculating a first latency value for each frame of data of the first processing task, the first latency value being based on a start of frame value minus an end of frame value of the frames of data of the first processing task;

calculating a second latency value for each frame of data of the second processing task, the second latency value being based on the start of frame value minus the end of frame value of the frames of data of the second processing task;

determining whether the first latency value satisfies a target frame rate of the first processing task to generate a latency outcome indicating whether the first processing task satisfies the target frame rate, the latency outcome being independent of the second processing task;

determining whether the second latency value satisfies a target frame rate of the second processing task to generate a further latency outcome indicating whether the second processing task satisfies the target frame rate, the further latency outcome being independent of the first processing task; and adjusting a current clock frequency of the processing system based on cumulative latency voting, wherein the latency outcome and further latency outcome correspond to votes representing task-specific latency satisfaction determinations used in the cumulative latency voting, the current clock frequency being increased when the cumulative latency voting indicates that either the first processing task or the second processing task fails to satisfy its respective target frame rate and decreased only when the cumulative latency voting indicates both the first processing task and the second processing task satisfy their respective target frame rates, wherein the first and second processing tasks are heterogeneous task types executed concurrently by the processing system.

18. The non-transitory processor-readable medium of claim 17, wherein the stored processor-executable instructions are configured to cause the computing device to perform operations further comprising:

registering the first processing task with a central processing unit (CPU) client framework;

registering the second processing task with the CPU client framework;

determining a preconfigured minimum clock frequency and a preconfigured maximum clock frequency using a first set of operating parameters of a first processing task and a second set of operating parameters of a second processing task, wherein the first and second processing tasks are executing concurrently;

initiating execution of the first processing task and the second processing task utilizing a dynamic clock and voltage scaling (DCVS) framework using a current clock frequency equal to a target clock frequency, wherein the target clock frequency is between the preconfigured minimum clock frequency and the preconfigured maximum clock frequency;

obtaining a first start of frame time value and a first end of frame time value for the first processing task;

obtaining a second start of frame time value and a second end of frame time value for the second processing task; and determining the first latency value for the first processing task using a first start of frame and a first end of frame and determining the second latency value for the second processing task using a second start of frame and a second end of frame.

19. The non-transitory processor-readable medium of claim 18, wherein:

the first set of operating parameters for the first processing task and the second set of operating parameters for the second processing task each comprise a minimum clock frequency, a maximum clock frequency, a target clock frequency, and a target frame rate; and the stored processor-executable instructions are configured to cause the computing device to perform operations further comprising determining the preconfigured minimum clock frequency and the preconfigured maximum clock frequency utilizing the minimum clock frequency of the first processing task, the maximum clock frequency of the first processing task, the target clock frequency of the first processing task, the target frame rate for the first processing task, the minimum clock frequency of the second processing task, the maximum clock frequency of the second processing task, the target clock frequency for the second processing task, the target frame rate for the second processing task, and a number of concurrently executing processing tasks.

20. The non-transitory processor-readable medium of claim 19, wherein:

the first latency value is based on a steady-state latency value for the first processing task; and the second latency value is based on a steady-state latency value for the second processing task.

* * * * *